United States Patent [19]
West et al.

[11] Patent Number: 5,721,068
[45] Date of Patent: Feb. 24, 1998

[54] ELECTROCHEMICAL CELL, GELLED ANODE, AND COATED CURRENT COLLECTOR THEREFOR

[75] Inventors: Jack Thomas West, McFarland; Franz Frederick Bonacker, Belleville; Terry Glen Messing, Verona, all of Wis.

[73] Assignee: Rayovac Corporation, Madison, Wis.

[21] Appl. No.: 612,038

[22] Filed: Mar. 7, 1996

Related U.S. Application Data

[60] Provisional application No. 60/001,152 Jul. 14, 1995.

[51] Int. Cl.⁶ .............................. H01M 6/22; H01M 4/42
[52] U.S. Cl. ..................... 429/190; 429/229; 429/245; 29/623.1
[58] Field of Search ....................... 429/190, 206, 429/229, 245; 29/623.1

[56] References Cited

U.S. PATENT DOCUMENTS

| | | |
|---|---|---|
| 2,959,631 | 11/1960 | Boswell . |
| 3,623,911 | 11/1971 | Oswin . |
| 3,954,505 | 5/1976 | Anderson . |
| 4,500,614 | 2/1985 | Nagamine et al. ............... 429/206 |
| 4,585,716 | 4/1986 | Chalkpoyk et al. ............... 429/206 |
| 4,812,374 | 3/1989 | Kagawa et al. ............... 429/50 |
| 4,851,309 | 7/1989 | Toyoguchi et al. ............... 429/194 |
| 4,994,333 | 2/1991 | Jose et al. ............... 429/190 |
| 5,039,576 | 8/1991 | Wilson ............... 428/626 |
| 5,108,494 | 4/1992 | Uemura et al. ............... 75/347 |
| 5,112,705 | 5/1992 | Hunter et al. ............... 429/206 |
| 5,128,222 | 7/1992 | Yoshizawa et al. ............... 429/190 |
| 5,139,900 | 8/1992 | Tada et al. ............... 429/206 |
| 5,168,018 | 12/1992 | Yoshizawa et al. ............... 429/190 |
| 5,209,995 | 5/1993 | Tada et al. ............... 429/229 |
| 5,240,793 | 8/1993 | Glaeser ............... 429/206 |
| 5,279,905 | 1/1994 | Mansfield, Jr. et al. ............... 429/27 |
| 5,308,374 | 5/1994 | Yoshizawa et al. ............... 29/623.1 |
| 5,312,476 | 5/1994 | Uemura et al. ............... 75/747 |
| 5,348,816 | 9/1994 | Shinoda et al. ............... 429/206 |
| 5,384,214 | 1/1995 | Sugihara et al. ............... 429/206 |
| 5,445,908 | 8/1995 | Inoue et al. ............... 429/229 |
| 5,541,021 | 7/1996 | Watanabe et al. ............... 429/229 X |

*Primary Examiner*—Stephen Kalafut
*Attorney, Agent, or Firm*—Quarles & Brady

[57] ABSTRACT

An electrochemical cell having a negative current collector coated with an alloy of bismuth and tin maintains acceptable performance level and is protected from failure due to vibration. Improved environmental compatibility is achieved by coupling the coated current collector with an anode that contains an alloy powder of bismuth and zinc that is substantially free of mercury, cadmium, calcium, indium, gallium, thallium, lead, and tin. Performance of electrochemical cells can also be improved by providing a soluble bismuth additive in the cell electrolyte.

118 Claims, 19 Drawing Sheets

ELECTROCHEMICAL CELL, GELLED ANODE, AND COATED CURRENT COLLECTOR THEREFOR

CROSS-REFERENCE TO RELATED APPLICATION

This application is a continuation-in-part of provisional application Ser. No. 60/001,152, filed Jul. 14, 1995.

FIELD OF THE INVENTION

The present invention relates generally to the field of electrochemical cells and in particular to alkaline cells.

BACKGROUND OF THE INVENTION

In recent years there has been an extensive worldwide effort in the battery industry to remove toxic and harmful metals from alkaline $MnO_2$ cells. Such metals had previously been added to control corrosion of zinc powder in the anode. Mercury, cadmium, and lead have been targeted, in particular, for removal.

Most effort has focused on removing such materials from the zinc powder, to which nearly all of these heavy metals had been added in efforts to prevent cell gassing and to improve cell performance. Mercury, which alloys with zinc, was considered a particularly beneficial additive in alkaline cells because it was known to raise the hydrogen overvoltage of the zinc surface which controlled both zinc corrosion and hydrogen gassing.

Mercury levels have been reduced from ~2.5% by battery weight to a nominal 0% in alkaline cylindrical cells. However, as mercury levels were reduced, it became very apparent that contact among particles of the anode active material (generally zinc) and between the particles and a current collector were compromised as was cell performance. Moreover, performance of low-mercury or mercury-free cells under vibration conditions also needed improvement. It has become clear that mercury enhanced the particle-to-particle contact and the particle-to-current collector contact because residual liquid mercury that remained on the zinc particle surfaces would provide flexible contact via liquid mercury interfaces. After mercury was removed, alternate indium and lead-bearing alloys with 500 ppm levels of lead were introduced to assist with such zinc inter-particle contact problems.

Much effort has been expended to deal with zinc particle contact and gassing problems introduced by the total removal of mercury and other heavy metals from the zinc powder. Cadmium is generally no longer added to cells. The industry is now facing a final effort to remove lead from the zinc powder. Because of concerns over contamination by impurities in the alloy and at the zinc powder surface, the industry has tried to address the gassing and performance concerns that have arisen in mercury-free cells with metal additives to the zinc powder by treating the zinc powder surface, while avoiding transplanting impurities by dissolution and diffusion from other raw materials into the complete cell system.

Common to these metal additives is a hydrogen overvoltage approximately equal to or higher than that of their host metal, zinc. Current technologies involve bismuth, indium, gallium, thallium, and tin, and oxides (hydroxides) and salts thereof. Other metal additives such as calcium, aluminum, strontium and lithium are also being used and patented, as noted below.

The first alloy to emerge upon removal of mercury and cadmium was a bismuth-indium-lead (BIP) alloy of zinc. In the attempt to eliminate lead, bismuth-indium-calcium (BIC) and bismuth-indium-aluminum (BIA) alloys are also being offered by zinc powder suppliers. More recently, bismuth-indium-aluminum-calcium (BIAC) alloys have been offered.

When provided as part of the zinc alloy, indium has been demonstrated to improve particle-to-particle contact and contact with the current collector. Unlike mercury, however, indium does not remain liquid at room temperature. The beneficial contact properties of the liquid mercury can be achieved by including indium hydroxide as an additive to the electrolyte of a cell containing indium in the zinc alloy. The soluble indium hydroxide plates on the zinc and is reputed to create a bridge between the neighboring particles, in effect, cementing the zinc powder system together. However, indium hydroxide, like indium, is less desirable from an environmental perspective.

Emerging technologies generally include at least bismuth and indium, suggesting that bismuth and indium in combination are capable of controlling most corrosion and other peripheral problems associated with mercury-free zinc powder. A review of literature on binary alloys reveals that bismuth and indium will form a homogeneous alloy with each other, but will not form a homogeneous alloy with zinc. Instead, bismuth and indium enter the grain boundaries of the zinc powder where, it is thought, they considerably reduce intergranular corrosion. However, being in the grain boundaries, these additives do not control iron-catalyzed zinc gassing as depicted in U.S. Pat. No. 5,312,476 by Matsushita Electric Industry Co. Ltd.

A serious performance problem of modern alkaline cells is their sensitivity to variable performance when vibrated during use. The surface area of the current collector is extremely small compared to the total surface area of the combined zinc powder-current collector system, particularly in large cells such as LR20 cells. A small contact problem on the current collector surface can intensify when a large amount of the zinc mass is momentarily isolated from the electrochemical process, such as by vibration. This isolation results in the current collector being used as the anode instead of the zinc.

If a brass current collector participates in the electrochemistry of the cell discharge, electrochemical reactions will cause black copper oxides to deposit on the current collector surface. These oxides are extremely non-conductive. Tin-plated brass current collectors have been used to avoid providing a non-conducting surface. Tin oxides are reasonably soluble in KOH electrolyte and, if the tin-plated surface participates electrochemically, it remains conductive until the underlying brass is exposed, creating the above-noted black oxides.

Patents germane to the above-noted issues are noted below.

U.S. Pat. No. 5,445,908 describes the use of a copper or copper alloy (such as brass) negative current collector subjected to an electroless plating with a metal such as tin, lead, copper, zinc or an alloy of two or more such metals having high hydrogen overvoltage to reduce corrosion.

U.S. Pat. No. 5,240,793 describes a low lead alkaline battery comprising bismuth and indium in the zinc powder.

U.S. Pat. No. 5,308,374 mentions zinc alloys having bismuth at a 0.01–0.5 weight percent for use in conjunction with gallium compounds for corrosion resistance.

U.S. Pat. No. 5,384,214 mentions zinc alloys having bismuth at a 0.01–0.5 weight percent for use in conjunction with yttrium compounds for corrosion resistance.

U.S. Pat. No. 5,279,905 concerns a zinc-air cell that has an indium layer deposited over a copper layer on a conductive substrate.

U.S. Pat. Nos. 5,312,476; 5,348,816; 4,812,374 and others describe alkaline batteries employing alloy powders of zinc with bismuth and indium, among other elements.

U.S. Pat. No. 5,039,576 describes an electrodeposition of a eutectic tin-bismuth alloy on a conductive substrate.

U.S. Pat. No. 4,851,309 describes a negative electrode that comprises an alloy comprising (1) at least one metal selected from the group consisting of Sn, Pb, In, and Bi and (2) Zn or Zn and Cd.

U.S. Pat. No. 5,108,494 relates to a non-amalgamated zinc alloy powder which comprises 1 ppm or less of iron as well as bismuth, indium and lead; or bismuth, indium and calcium; or lead with bismuth, aluminum, or calcium; or calcium, bismuth and aluminum; or indium, calcium and aluminum.

U.S. Pat. No. 5,348,816 relates to an negative electrode alloy containing zinc and one or more of an oxide or hydroxide of indium, lead, gallium, or bismuth. Also disclosed is the addition of fiber material in the anode to improve high vibration strength and impact resistance.

U.S. Pat. No. 3,954,505 describes assembly of an alkaline primary battery, including a tin-plated steel, brass or bronze current collector.

U.S. Pat. No. 4,500,614 describes an amalgamated alloy powder made of zinc, mercury and at least two other metals selected from the group consisting of gallium, indium and thallium.

U.S. Pat. No. 4,812,374 concerns an amalgamated indium-zinc anode active material.

U.S. Pat. No. 5,112,705 concerns a negative current collector in an alkaline cell, where the current collector is coated with a lead containing layer to reduce gassing during storage of the cell.

U.S. Pat. No. 5,128,222 describes a zinc-alkaline battery containing a surfactant in the electrolyte.

U.S. Pat. No. 5,168,018 concerns mercury-free alkaline cells that comprise a zinc alloy, an indium compound, and optionally a surfactant. The indium compound is indium hydroxide or indium sulfide. The zinc alloy contains at least one of indium, lead, bismuth, lithium, calcium and aluminum.

U.S. Pat. No. 5,240,793 describes a low-lead zinc powder comprising indium, bismuth and other optional ingredients.

U.S. Pat. No. 5,139,200 describes a non-amalgamated zinc alloy powder containing lead and calcium, or calcium and bismuth, and having indium coated on a surface of the powder.

U.S. Pat. No. 5,209,995 describes a zinc alloy powder that includes either aluminum or calcium and indium coated on a surface of the powder.

What is desired is an alkaline cell (and components thereof) that can be made substantially free of toxic heavy metals but that experiences better performance under conditions of vibration. It is also desired that the performance characteristics be maintained despite adverse storage and usage conditions.

SUMMARY OF THE INVENTION

The present invention, which meets the objects described above, is summarized in that improved cell performance under conditions of vibration are realized in a cell that presents minimal environmental challenges and which includes a current collector coated with an alloy of bismuth and tin and which includes in the anode an alloy containing zinc and bismuth.

The present invention is also summarized in that a cell that comprises zinc or a zinc alloy in the anode exhibits improved performance under conditions of vibration when the cell has a current collector coated with an alloy of bismuth and tin.

The present invention is also summarized in that a cell having an anode that contains an alloy that includes zinc and bismuth exhibits improved shelf life and environmental compatibility, and performance comparable to the state of the art, but at lower cost.

The present invention is further summarized in that providing in a cell a bismuth additive that is soluble in the cell electrolyte eliminates the need for an indium hydroxide or indium sulfide electrolyte additive and improves the amperage retention of partially discharged cells, when the anode contains an alloy of zinc and bismuth in a suitable ratio. The effect of the soluble bismuth additive is particularly apparent after storage of cells at high temperatures (130° to 160° F.) for extended periods of time.

The present invention is still further summarized in that the improvement realized from the soluble bismuth additive is further enhanced when a current collector coated with an alloy of bismuth and tin is provided in a cell in combination with the anode that contains an alloy of zinc and bismuth in a suitable ratio.

It is an object of the present invention to provide an alkaline cell with improved performance under conditions of vibration.

It is another object of the present invention to provide a cell having improved performance under conditions of vibration while not affecting performance after storage for an extended period of time at high temperature.

It is a feature of the present invention that a suitable anode active material is an alloy of zinc and bismuth.

It is another feature of the present invention that a suitable current collector is a current collector coated with an alloy of bismuth and tin.

It is yet another feature of the present invention that an alkaline cell includes an anode containing an alloy of zinc and bismuth in combination with a current collector coated with an alloy of bismuth and tin.

It is an advantage of the present invention that neither the anode active material, the gelled anode, nor an alkaline cell containing the gelled anode requires any added mercury, lead, indium, gallium, thallium, or cadmium, which elements are less desirable in such a cell.

It is another advantage of the present invention that cell stability and performance are improved, particularly after storage at high temperature.

It is yet another advantage of the present invention that cell stability and performance are improved, particularly after partial discharge and storage at high temperature.

It is still another advantage that the elimination of indium from the cell results in significant cost savings and improved environmental desirability.

Other objects, features and advantages of the present invention will become apparent upon consideration of the following detailed description taken in conjunction with the accompanying drawings.

BRIEF DESCRIPTION OF THE DRAWINGS

In FIG. 11, the cells also contained a soluble bismuth compound.

DETAILED DESCRIPTION OF THE INVENTION

All patents noted in the Background of the Invention are incorporated herein by reference.

Figure 1:
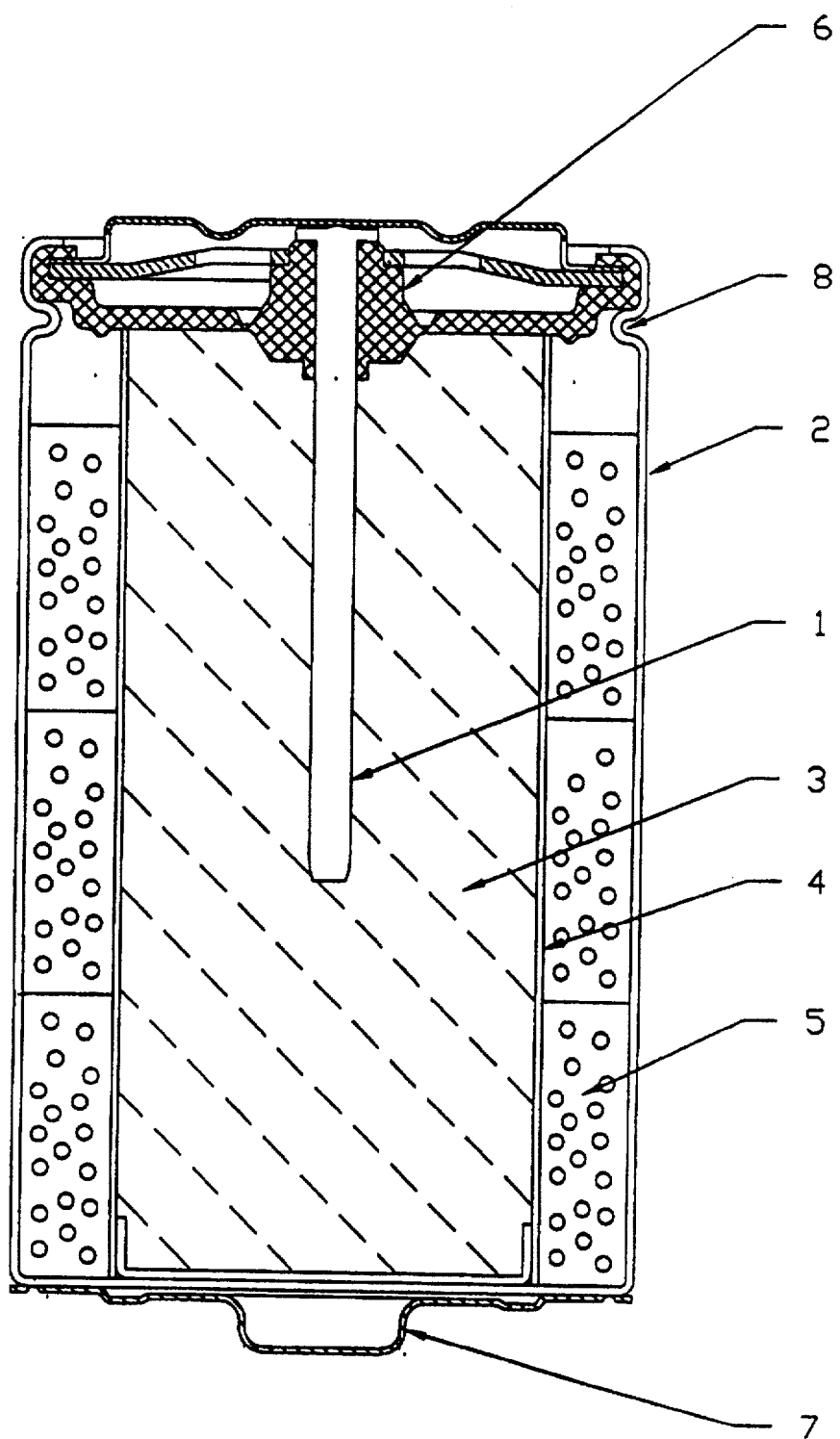
FIG. 1 is a cross-sectional diagram of an alkaline cylindrical battery incorporating the present invention.

FIG. 1 is a cross-sectional diagram of an alkaline cylindrical battery incorporating the present invention. The battery includes a positive current collector 2, which is a drawn steel container open on one end that is about 0.012 inches thick. Three cathode annular rings 5 are placed into the positive current collector, forming a pressure contact with the positive current collector 2. A bead 8 is rolled into the container near the open end to support the sealing disk. A separator 4 and an anode 3 are placed inside of the cathode rings 5. The anode 3 contains a powder of zinc or a zinc alloy, an electrolyte, and a gelling agent, and can contain organic polymers, a surfactant or both. A suitable gelled anode is described in U.S. Pat. No. 4,963,447 (Nishimura), which is incorporated herein by reference. A sealing disk 6 containing a negative current collector 1 is placed into the open end of the container and in contact with the bead. The open end of the container is crimped over the sealing disk thus compressing the sealing disk between the crimp and the bead to seal the cell. Terminal cap 7 is welded onto the positive current collector 2. Although a cylindrical cell is shown, the invention may be applied equally well to any alkaline cell, without regard to size or shape, including, but not limited to, sizes AA, AAA, C, D, 9 V (1604), and various button cells.

The present invention relates in part to the negative current collector 1, sometimes referred to herein as the current collector or the "nail," which is the term commonly used in the industry. Although the art has largely focused on improvements to the anode to reduce contact problems, the present inventors have recognized that an improved current collector can more completely reduce contact problems even in cells using existing anode technology, which includes an alloy comprising zinc and at least two of the following elements: bismuth, indium, calcium, and aluminum.

In cells of the present invention, the negative current collector is coated with an alloy that includes bismuth and tin in a suitable ratio. The coating is substantially free of lead or indium. "Substantially free" means that none of the element is added before, during or after production of the alloy. The possibility remains that a very small amount of residual lead or indium may remain in the starting materials. The coating can include bismuth at about 90% or less by weight, or as little as 0.2% by weight, or at any percentage in that range. In this patent application, the word "about" is intended to mean plus or minus 2%. It may even be possible to use lower percentages of bismuth if a bismuth additive that is soluble in the cell electrolyte is provided as is described elsewhere herein. The coating can include tin at as much as 99.8% by weight, or as little as 10%, or at any percentage in that range. If the alloy contains only bismuth and tin, a suitable bismuth:tin weight ratio for the alloy can range from 90:10 to 0.2:99.8. An alloy of greater than 90% bismuth is more difficult to coat onto the current collector than alloys containing less bismuth and a higher number of test failures are observed among cells containing nails with high bismuth coatings. Preferred bismuth-tin coatings contain 60% bismuth or less, more preferably 43% bismuth or less, most preferably the bismuth is provided at 20% or less by weight. A highly preferred amount of bismuth is about 10% bismuth, the balance being tin. "About" is intended to reflect the uncertainty in the exact percentages that can be obtained from a commercial source of alloys. Typically, commercial providers can provide the specified composition plus or minus two percent of the specified amount. Thus, "about 10% bismuth" would generally be expected to fall in the range of 8% to 12%. A bismuth:tin ratio of 43:57 provides an alloy having a melting point of 167° C., which is suitable for processing as described herein. However, all of the described alloys also have melting points within a suitable temperature range and are compatible with the coating process described herein.

When the alloy has a bismuth:tin ratio of between 0.2:99.8 and 10:90, continuously improving discharge vibration performance is observed. Even at a ratio of 0.2:99.8, discharge vibration performance seems to be better on average than coatings that include 100% tin.

The substrate current collector that is coated according to the present invention is formed of a conductive material and can be any of the several types now used in the art, including, but not limited to, a steel, brass, or copper nail. Since the coating provided on the negative current collector seems also to reduce evolution of hydrogen gas, additional opportunity arises to use other materials for the current collector, including Ni, Co, and Ti, to name a few, which materials have previously been avoided. Brass nails are preferred. Tin-plated brass nails, which are commonly employed in the battery industry can also be coated with the alloy coating and are most preferred by the inventors. Comparable improvement in discharge vibration performance was observed whether the bismuth-tin alloys were placed on brass nails or on tin-plated brass nails. In addition, similar improvement is observed when the coating alloy contains bismuth, tin and a small amount (less than 5%, and preferably 3%) of another element that can alloy with bismuth and tin, which element can include, but is not limited to, titanium, thallium, zirconium, calcium, cerium, magnesium, manganese, silicon, zinc, copper, indium, cadmium, and lead. Taken together, it appears that it is sufficient that the current collector coating contain at least 0.2% bismuth and may contain less than 5% of another element that can alloy with bismuth and tin. Other elements may also be present in the coating alloy, with the balance of the coating being tin.

It has also been determined that similar benefit is not observed when the current collector is coated with indium alone, tin alone, bismuth alone, or with bismuth-indium or indium-tin alloys.

It is possible to correlate the visible condition of a current collector on autopsy after use with its "passing" or "failing" the discharge vibration performance test. Current collectors from failing cells exhibit gray, black and white oxide or hydroxide deposits, while current collectors from passing cells are shiny and indistinguishable from unused current collectors.

The coating may be applied by any method that provides complete coverage of the current collector surface, including, for example, cladding, plating, melt coating, electroplating, sputter deposition or chemical vapor deposition (C.V.D.). The coating can be performed after the negative current collector is assembled with the sealing disk, but may be performed separately before assembly. A sealing disk with current collector assembly can be conveyed to a tank containing a molten alloy (e.g., in the temperature range of between 72° C. and 180° C.) and dip coated with the alloy. A flux may be used to facilitate the coating and bonding of the alloy to the nail. After sufficient time for complete coating, the nail would be conveyed out of contact with the molten alloy and conveyed to a deionized water bath for flux removal. Alternatively, the current collector can itself be formed of an alloy of bismuth and tin in a ratio that is in keeping with the present invention.

The coated current collector of the type described herein may be used in cells other than primary and secondary alkaline cells, namely any electrochemical cell that includes a zinc anode, including, but not limited to, a zinc/air cell, nickel-zinc cell, alkaline-manganese (zinc-$MnO_2$) cell (including rechargeable cells , silver-zinc cell, and mercury-zinc cell. A complete reference of the types of cells that may be used can be found in the "Handbook of Batteries and Fuel Cells," D. Linden, ed., McGraw Hill, New York, First edition (1984) and Second edition (1994), both of which are incorporated herein by reference.

For the performance and environmental reasons described in detail elsewhere herein, the coated current collector described herein provides particular advantage when combined with an anode that contains an alloy of zinc and bismuth but is substantially free of mercury, cadmium, calcium, indium, gallium, thallium, lead, and tin. The anode is in all other regards conventional. References herein to a "bismuth-only alloy" are intended to refer to alloys that contain bismuth and zinc but which are substantially free of all of the other elements identified in the previous sentence. An alloy is "substantially free" of an element if the element has not been added to the alloy before, during or after production of the zinc powder. Although these elements are not purposely added during production, detectable amounts of these materials may remain in the zinc powder itself because of the limitations inherent in preparation of commercial zinc powder.

Bismuth is provided in the preferred alloy at a concentration in the range of greater than about 100 ppm to about 2000 ppm, with a preferred range being between 200 and 500 ppm, a more preferred range between about 240 and 475 and a most preferred concentration being about 450 ppm. At this level, the lowest gassing rate is observed.

It has been observed, however, that performance advantage is also realized when the coated current collector is used in combination with other anodes containing other types of alloys bearing indium, especially bismuth-indium-calcium (BIC). Thus, it is thought that still other indium containing alloys will also benefit from use with a bismuth-tin coated nail. Such alloys include, in addition to BIC, bismuth-indium-lead (BIP), bismuth-indium-aluminum (BIA), and bismuth-indium-aluminum-calcium (BIAC), among others. These alloys are commercially available from a number of sources. Each contains in the range of 250–500 ppm bismuth, and generally comparable amounts of indium, calcium, aluminum, and lead, as appropriate.

Upon removal of substantially all additives but bismuth and zinc from the anode alloy, no significant increase in zinc powder gassing is experienced when cells containing such an anode are compared to prior cells having an identical level of iron impurity. However, significant particle contact problems are experienced in such cells between a tin-plated (or brass) current collector and zinc powders containing more than about 200 ppm bismuth. On the other hand, if the current collector is coated in accordance with the present invention, the contact problems are alleviated.

To reduce the likelihood of corrosion and gassing, it is also preferred that the anode alloy include low iron levels, preferably 3 ppm or less, or 2 ppm or less iron, or 1 ppm or less iron in the alloy. U.S. Pat. Nos. 5,312,476, 5,425,798, and 5,108,494, which relate to the use of low-iron materials in alkaline cell anode alloys, are incorporated herein by reference.

It is also disclosed herein that improved performance and service life are realized after periods of storage at high temperatures (in the range of about 100° F. to 160°, and particularly in the range of about 130° to 160° F.), when the bismuth-tin coated current collector of the present invention and the bismuth-only zinc alloy of the present invention are provided in combination in a cell.

Performance of conventional cells containing existing anode alloys, including a BIC alloy, is depressed after storage at 130° or 160° F. relative to performance at 70° or 113° F., particularly the discharge at higher voltage endpoints (1.1 V and 1.0 V), which can be expected to negatively affect high rate (high current drain) performance applications. Such storage conditions are also typical inside automobiles, trucks, and the like in hot weather.

In contrast, the Examples following herewith demonstrate the improved performance at higher voltage endpoints after storage at high temperatures of cells containing the bismuth-only alloy in the anode and the bismuth-tin coated nail of the present invention.

Finally, it is also herein demonstrated that when the coated nail of the present invention is provided in a cell in combination with the bismuth-only zinc alloy of the anode, it is not necessary to include indium hydroxide in the cell electrolyte to address contact problems, as has been previously thought. Instead, a soluble bismuth additive, which is both less expensive and more environmentally desirable than indium hydroxide, can be provided to achieve comparable or superior performance results. Such an additive can be, but is not limited to, sodium bismuthate, bismuth hydroxide, bismuth trioxide, and bismuth sulfate, and combinations thereof. Sodium bismuthate is considered a preferred additive. Of course, other bismuth oxides and salts are also envisioned to fall within the scope of the invention.

A soluble bismuth additive can be provided in the electrolyte at between 0.001% and 0.2%, or more preferably between 0.05% and 0.09%, of the weight of the zinc gel formula to achieve improved performance, especially after storage at 130° F. or 160° F.

While other oxides (e.g., gallium oxide and yttrium oxide) are also shown to substitute well for indium hydroxide for control of corrosion, it has been found that both of these additives were inferior to the bismuth additive on cell discharge performance, particularly after high temperature storage. Improvement in discharge performance due to gallium and yttrium additives is observed whether or not the current collector is coated with the bismuth-tin alloy, but is enhanced further by use with the coated current collector. Further, the improvement attributable to the soluble bismuth additive is recognized not only in cells that contain a bismuth-only zinc alloy, but also in cells that contain anode alloys that comprise mercury, cadmium, calcium, aluminum, indium, gallium, thallium, lead, or tin.

The present invention will be more understood upon consideration of the following Examples which are intended to be exemplary of, but not to limit, the invention.

EXAMPLES

Discharge Vibration Tests

In discharge-vibration tests, cells were subjected to a vibration profile while being discharged on a prescribed resistance in which the vibration frequency was increased from 10 Hz to 55 Hz at a rate of 1 Hz per minute. Then, the vibration frequency was decreased from 55 Hz to 10 Hz at a rate of 1 Hz per minute. The total cycle time was 90 minutes. The closed circuit voltage on a 2.2 Ohm load (LR20 cell) or 3.9 Ohm load (LR6 cell) was measured at 5 minute intervals during the test. In various tests, data were collected for 30, 60 or 90 minutes. The leads were soldered to the batteries to ensure contact during the vibration cycle. A battery was deemed to have failed the test if the closed circuit voltage was below an acceptable voltage after a 30 minute test cycle. For D size (LR20) cells, the acceptable voltage is 1.0 volt. For AA size (LR6) cells, the acceptable voltage is 0.75 volt.

Vibration-induced failure reduced by Bi-Sn nail coating

Table 1 demonstrates the performance improvement in LR20 cells containing a bismuth-only zinc alloy and a current collector coated with a bismuth-tin alloy over cells containing other current collector coatings. The amount of bismuth, in ppm, is shown in the column headed Zinc Powder Type. The composition (in %) of the current collector coating is shown in the column headed Additional Current Collector Coating. It is apparent from these data that while a small improvement is observed with bismuth-indium and with indium-tin alloys, the improvement was dramatic when bismuth-tin alloys coat the collector, without regard to the nature of the current collector itself.

TABLE 1

Discharge — Vibration Result
LR20 Current Collector Coating Trial

| Zinc Powder Type | Base Current Collector Nail Type | Additional Current Collector Coating | Failing 1.0 Volts At 30 Min. On Test |
|---|---|---|---|
| Bi 244 | Sn-Plated Brass | None (Ctrl) | 10/10 |
| Bi 244 | Brass | Bi 33.7/In 66.3 | 8/10 |
| Bi 244 | Brass | In 52/Sn 48 | 7/10 |
| Bi 244 | Brass | Bi 43/Sn 57 | 0/8 |
| Bi 244 | Sn-Plated Brass | Bi 43/Sn 57 | 0/10 |
| Bi 455 | Sn-Plated Brass | None (Ctrl) | 10/10 |
| Bi 455 | Brass | Bi 33.7/In 66.3 | 9/10 |
| Bi 455 | Brass | In 52/Sn 48 | 10/10 |
| Bi 455 | Brass | Bi 43/Sn 57 | 0/8 |
| Bi 455 | Sn-Plated Brass | Bi 43/Sn 57 | 2/10 |

Failure reduction is maintained over time

The ability of a bismuth tin current collector coating to resist failure in a discharge vibration test is maintained over time as shown in Table 2 wherein the discharge vibration test data was extended to a 60 minute test.

TABLE 2

Discharge Vibration Results
LR 20 Current Collector Coating Trial

| Zinc Powder Type | Base Current Collector Base Type | Current Collector Coating | Failing @ 1.0 Volts at 30 Min on Test | Failing @ 1.0 Volts at 45 Min on Test | Failing @ 1.0 Volts at 60 Min on Test |
|---|---|---|---|---|---|
| Bi 244 | Sn-Plated Brass | None | 4/10 | 7/10 | 9/10 |
| Bi 244 | Brass | None | 3/10 | 6/10 | 9/10 |
| BIC | Sn-Plated Brass | None | 0/10 | 0/10 | 1/10 |
| Bi 244 | Sn-Plated Brass | 100% Bi | 2/10 | 7/10 | 9/10 |
| Bi 244 | Sn-Plated Brass | Bi 31/ Sn 66/ Zn 3 | 0/10 | 0/10 | 0/10 |
| Bi 244 | Sn-Plated Brass | Bi 43/ Sn 57 | 0/10 | 2/10 | 0/10 |
| Bi 455 | Sn-Plated Brass | None | 7/10 | 10/10 | 10/10 |
| Bi 455 | Brass | None | 8/10 | 10/10 | 9/10 |
| BIC | Sn-Plated Brass | Bi 43/ Sn 57 | 0/10 | 0/10 | 0/10 |
| Bi 455 | Sn-Plated Brass | 100% Bi | 5/10 | 9/10 | 9/10 |
| Bi 455 | Sn-Plated Brass | Bi 31/ Sn 66/ Zn 3 | 0/10 | 1/10 | 0/10 |
| Bi 455 | Sn-Plated Brass | Bi 43/ Sn 57 | 0/10 | 0/10 | 0/10 |

A wide range of Bismuth-Tin ratios are effective

Excellent resistance to failure in a discharge vibration test was observed when the ratio of bismuth to tin was varied from 90:10 to 10:90, as is shown in Table 3.

In each tested case, the tested cells included an alkaline gelled anode containing a bismuth-only zinc alloy containing bismuth at 455 ppm. In each case, a tin-plated brass current collector was coated with the indicated coating. An indium-only coating demonstrated failure rates comparable to an uncoated tin-plated brass current collector.

TABLE 3

Discharge Vibration Results
LR 20 Current Collector Coating Trial

| Current Collector Coating | Failing @ 1.0 Volts at 30 Min on Test | Failing @ 1.0 Volts at 45 Min on Test | Failing @ 1.0 Volts at 60 Min on Test | Failing @ 1.0 Volts at 75 Min on Test | Failing @ 1.0 Volts at 90 Min on Test |
|---|---|---|---|---|---|
| Sn | 3/10 | 5/10 | 5/10 | 5/10 | 5/10 |
| Bi 90/Sn 10 | 0/10 | 0/10 | 0/10 | 0/10 | 0/10 |
| Bi 75/Sn 25 | 0/10 | 0/10 | 0/10 | 1/10 | 0/10 |
| Bi 57/Sn 43 | 1/10 | 0/10 | 0/10 | 1/10 | 0/10 |
| Bi 50/Sn 50 | 0/10 | 1/10 | 0/10 | 1/10 | 0/10 |
| Bi 40/Sn 60 | 1/10 | 0/10 | 0/10 | 0/10 | 0/10 |
| Bi 25/Sn 75 | 0/10 | 0/10 | 0/10 | 0/10 | 0/10 |
| Bi 10/Sn 90 | 0/10 | 1/10 | 0/10 | 0/10 | 0/10 |
| In 99.9% | 4/10 | 3/10 | 5/10 | 6/10 | 5/10 |

Discharge Vibration Plots

A series of figures demonstrates the superior performance in discharge vibration tests (CCV at 2.2 Ohm) of cells that contain a current collector coated with a bismuth-tin alloy.

Figure 2:
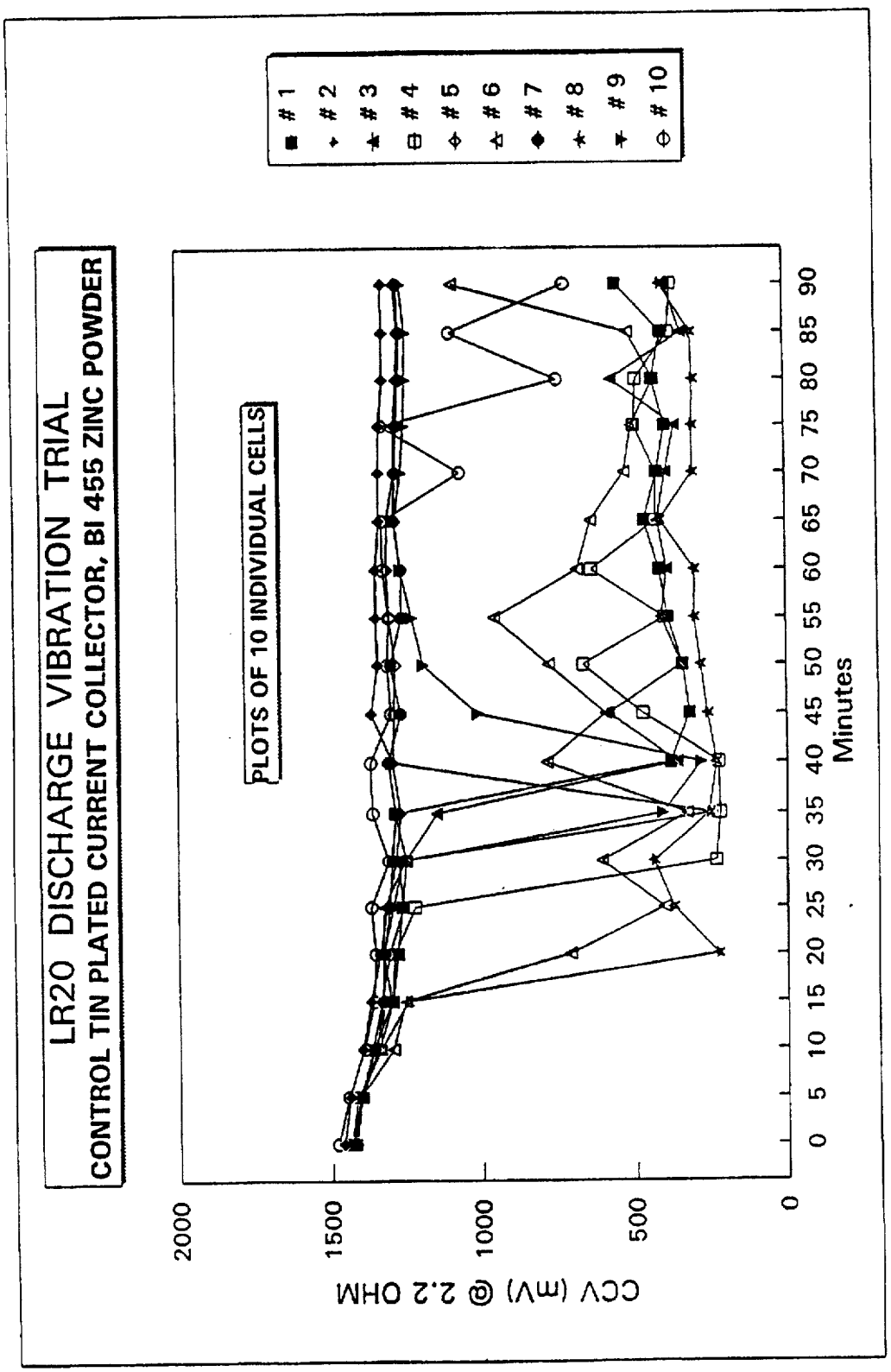
FIG. 2 plots performance over time of ten LR20 cells that contain a bismuth-only zinc anode alloy (455 ppm Bi) and a conventional tin-plated current collector.

FIG. 2 plots performance over time showing numbers of performance failures of ten LR20 cells that contain a bismuth-only zinc anode (455 ppm Bi) alloy and a conventional tin-plated current collector. Most cells experienced failure over the course of the 90 minute test.

Figure 3:
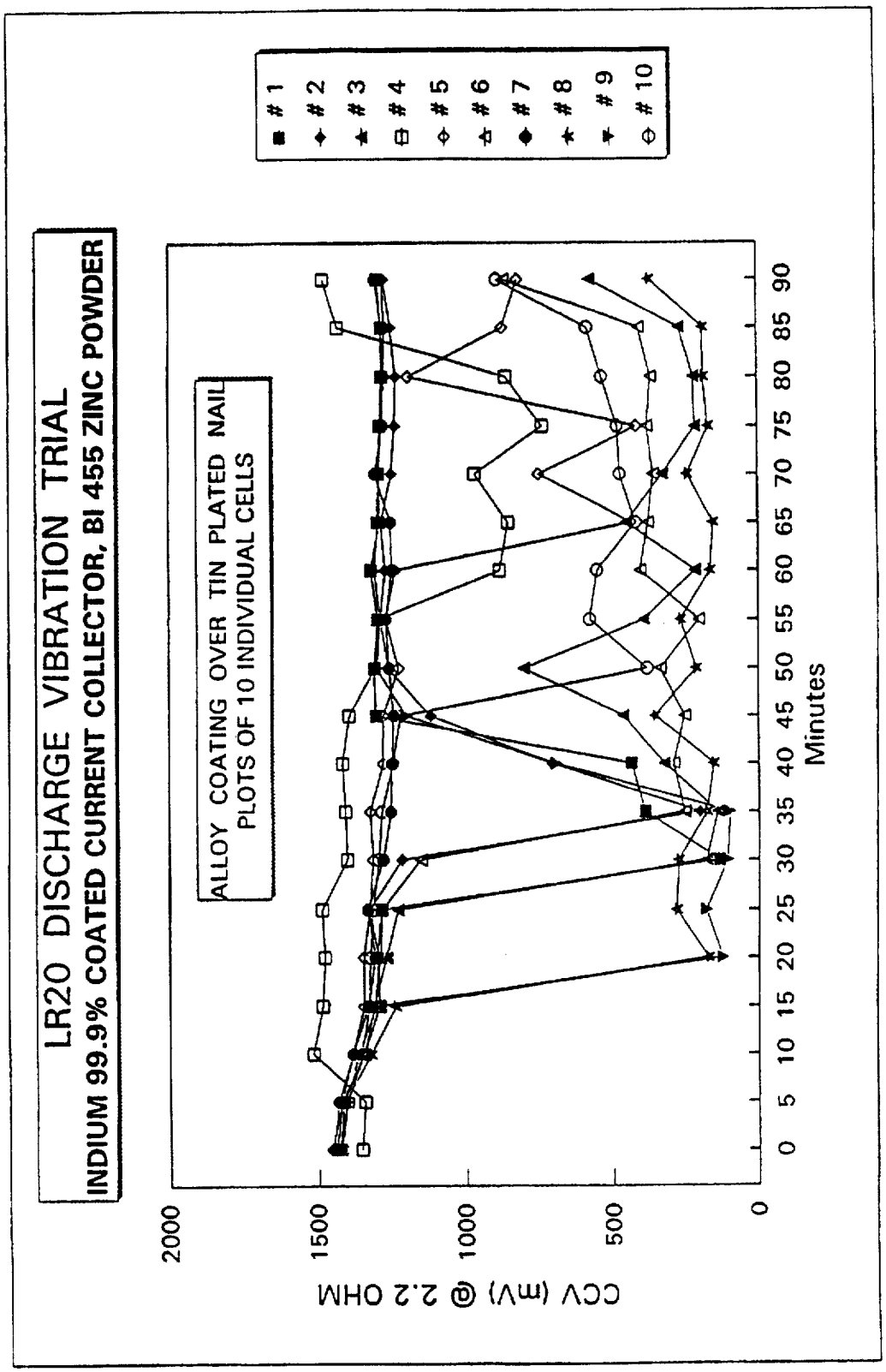
FIG. 3 plots performance over time of ten LR20 cells that contain a bismuth-only zinc anode alloy (455 ppm Bi) and a tin-plated current collector coated with indium.

FIG. 3 plots performance over time showing numbers of performance failures of ten LR20 cells that contain a bismuth-only zinc anode alloy (455 ppm Bi) and a tin-plated current collector coated with indium. Most cells experienced failure over the course of the 90 minute test.

Figure 4:
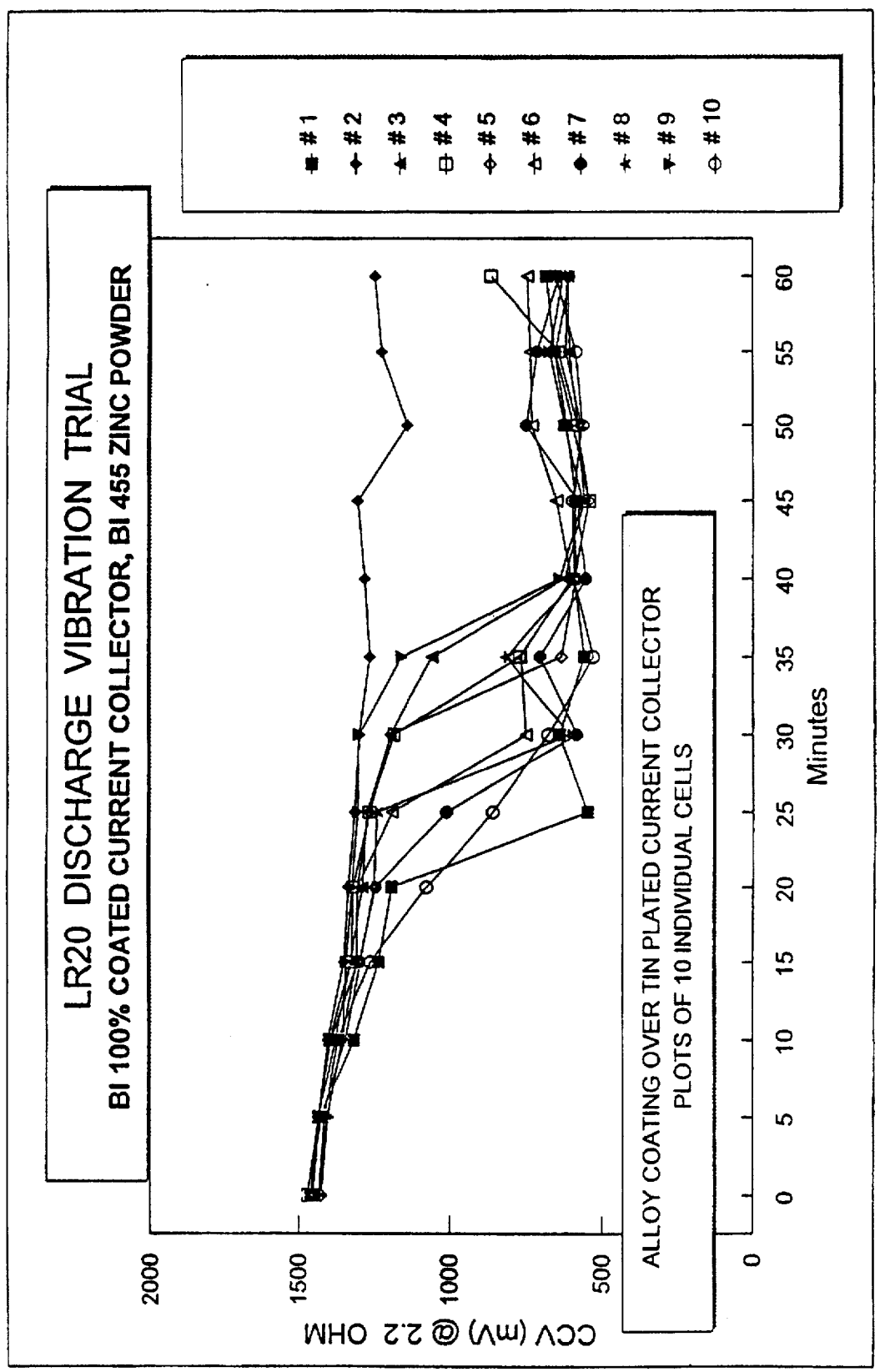
FIG. 4 plots performance over time of ten LR20 cells that contain a bismuth-only zinc anode alloy (455 ppm Bi) and a tin-plated current collector coated with bismuth.

FIG. 4 plots performance over time showing numbers of performance failures of ten LR20 cells that contain a bismuth-only zinc anode alloy (455 ppm Bi) and a tin-plated current collector coated with bismuth. Most cells experienced failure over the course of the 60 minute test.

Figure 5:
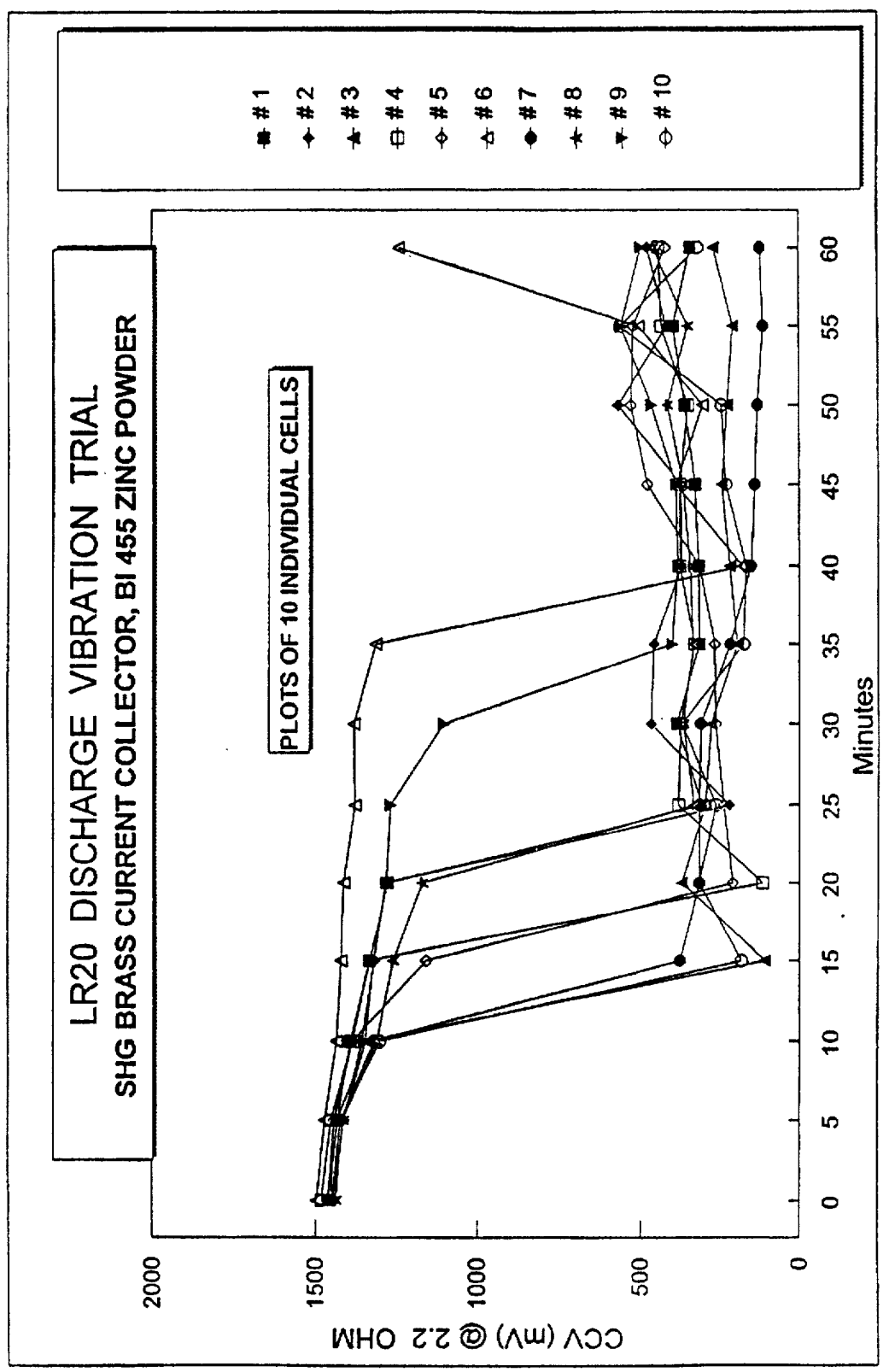
FIG. 5 plots performance over time of ten LR20 cells that contain a bismuth-only zinc anode alloy (455 ppm Bi) and a conventional brass current collector.

FIG. 5 plots performance over time showing number of performance failures of ten LR20 cells that contain a bismuth-only zinc anode alloy (455 ppm Bi) and a conventional brass current collector. All cells experienced failure over the course of the 60 minute test.

Figure 6:
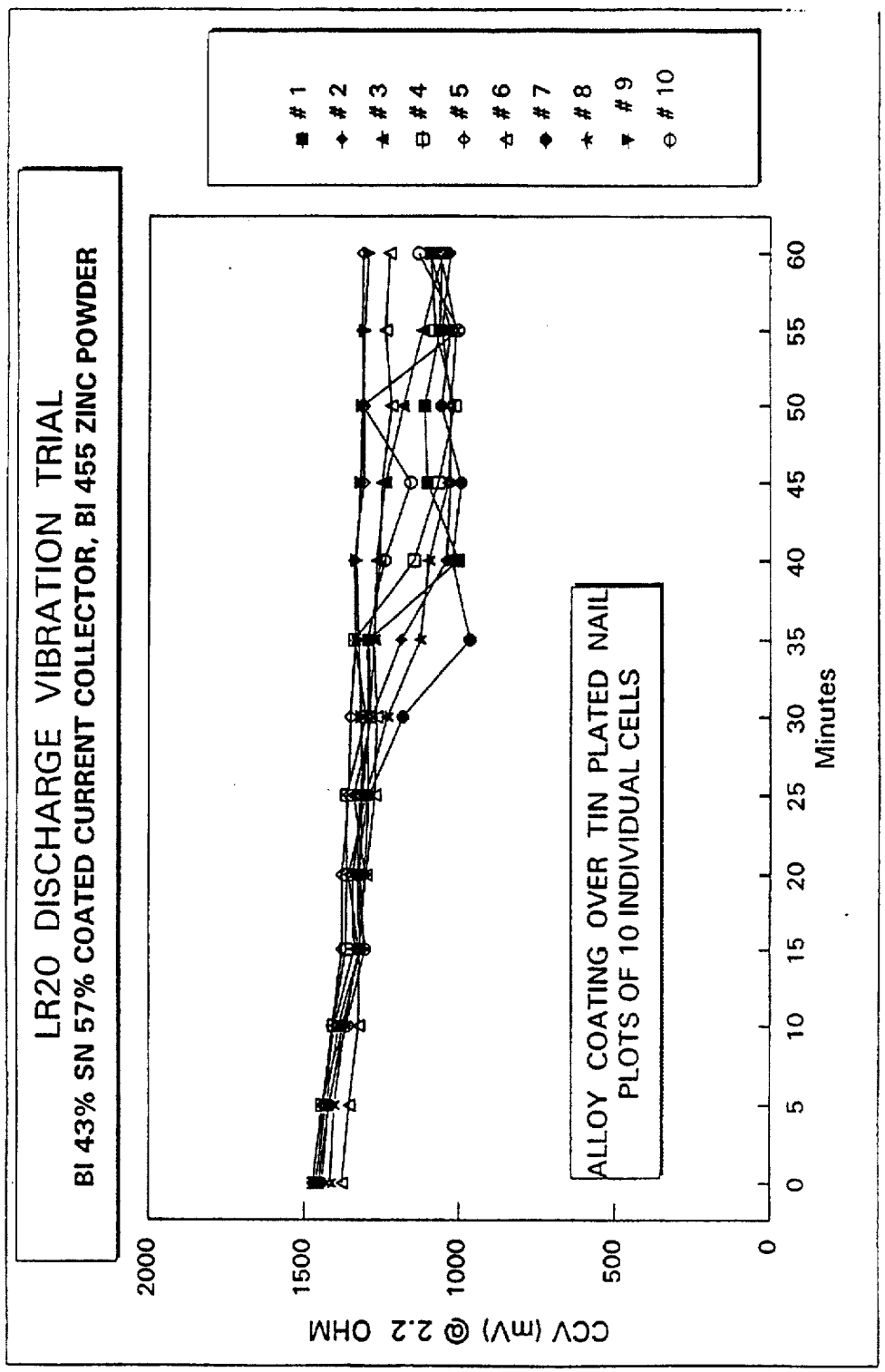
FIG. 6 plots performance over time of ten LR20 cells that contain a bismuth-only zinc anode alloy (455 ppm Bi) and a tin-plated current collector coated with a bismuth-tin (43:57) coating in accordance with the present invention.

FIG. 6 plots performance over time showing the improved performance of ten LR20 cells that contain a bismuth-only zinc anode alloy (455 ppm Bi) and a tin-plated current collector coated with a bismuth-tin (43:57) coating in accordance with the present invention. None of the cells experienced failure over the course of the 60 minute test.

Figure 7:
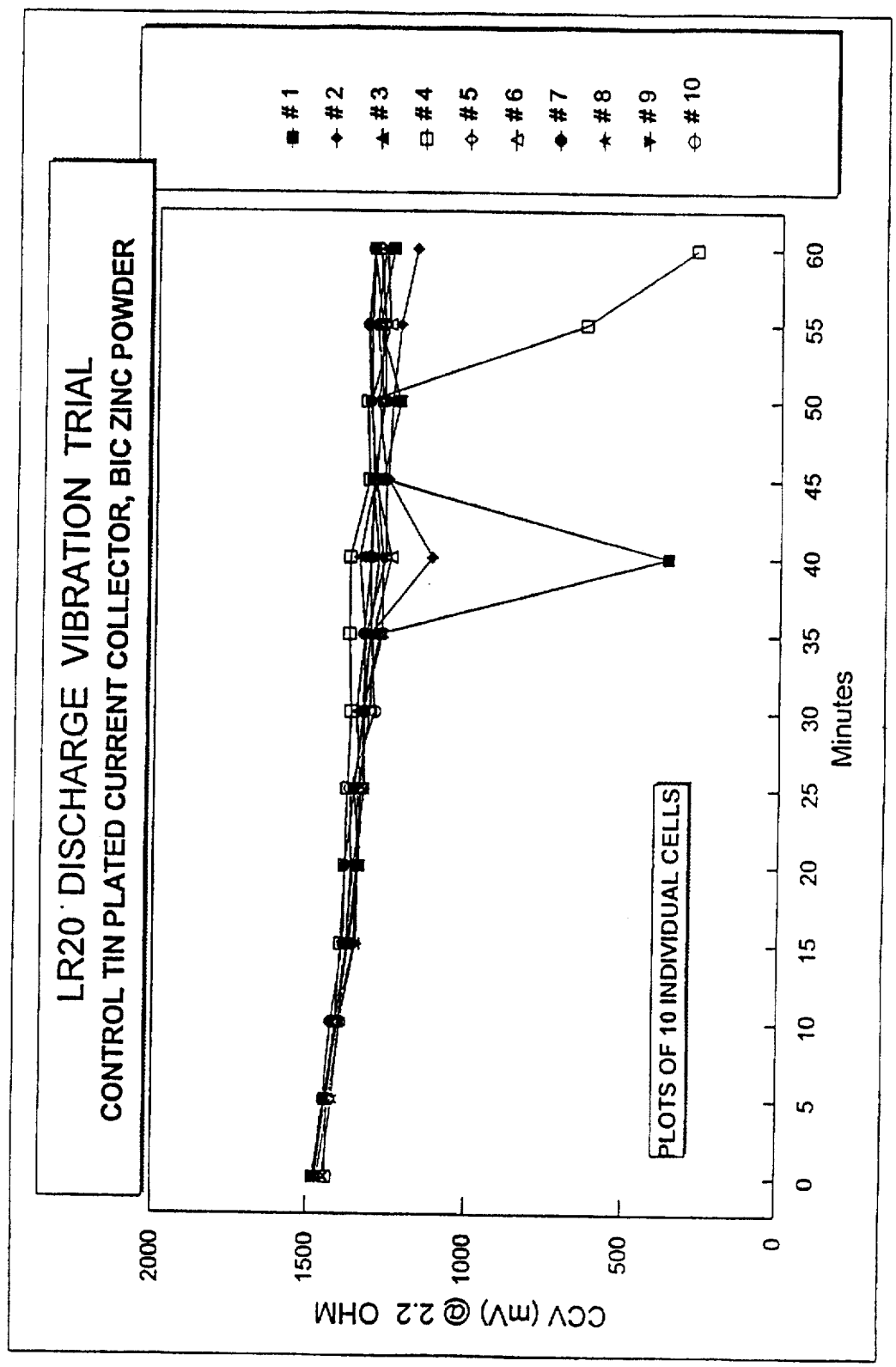
FIG. 7 shows performance over time of ten LR20 cells that contain a BIC-zinc anode alloy and a conventional tin-plated current collector.

FIG. 7 shows performance over time showing two performance failures out of ten LR20 cells that contain a BIC-zinc anode alloy and a conventional tin-plated current collector. Two cells exhibited failure over the course of the 60 minute test.

Figure 8:
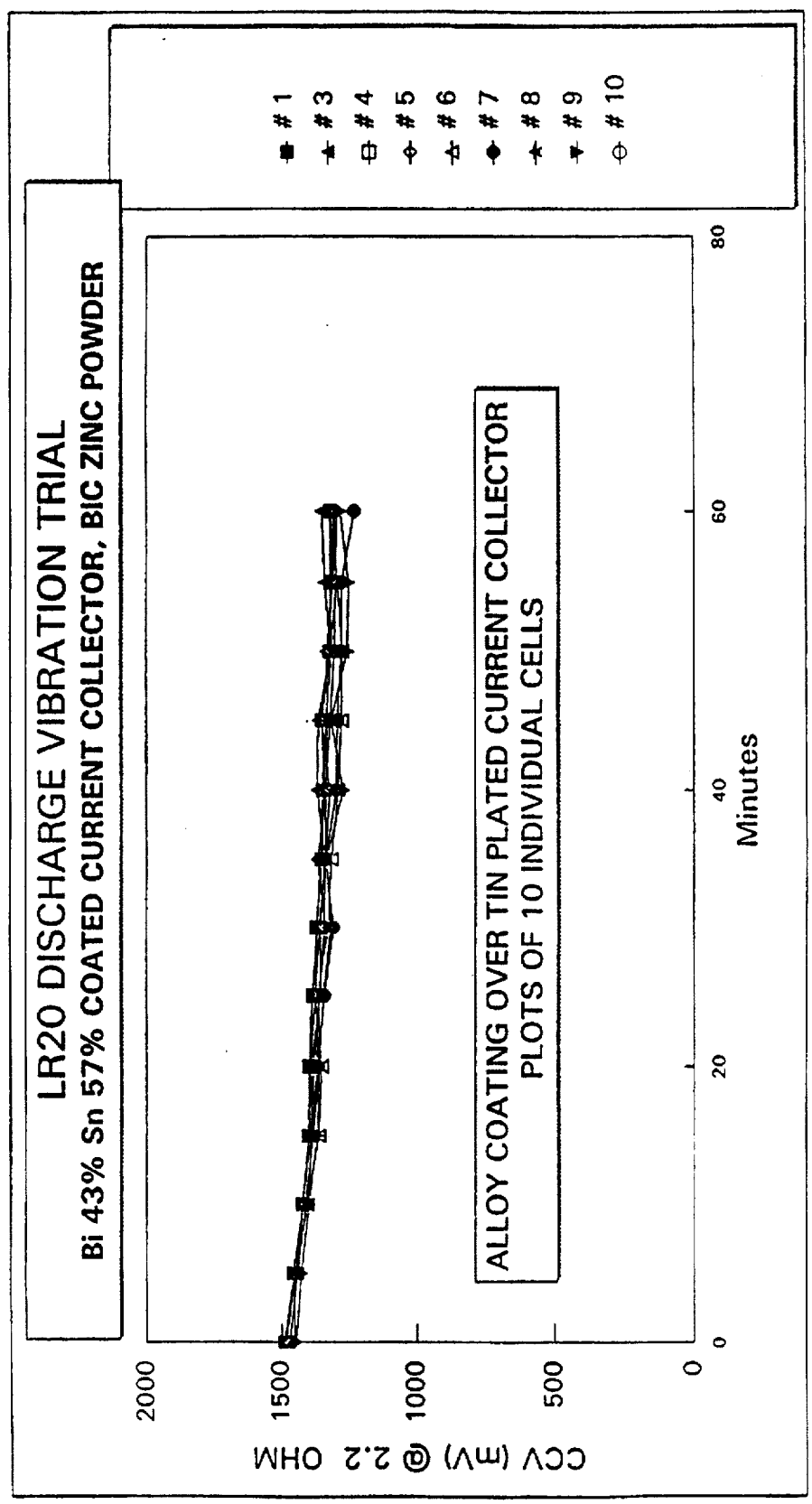
FIG. 8 shows performance over time of ten LR20 cells that contain a BIC-zinc anode alloy and a tin-plated current collector coated with a bismuth-tin (43:57) coating in accordance with the present invention.

FIG. 8 shows performance over time showing no performance failures for ten LR20 cells that contain a BIC-zinc anode alloy and a tin-plated current collector coated with a bismuth-tin (43:57) coating in accordance with the present invention. None of the cells exhibited failure over the course of the 60 minute test.

Figure 9:
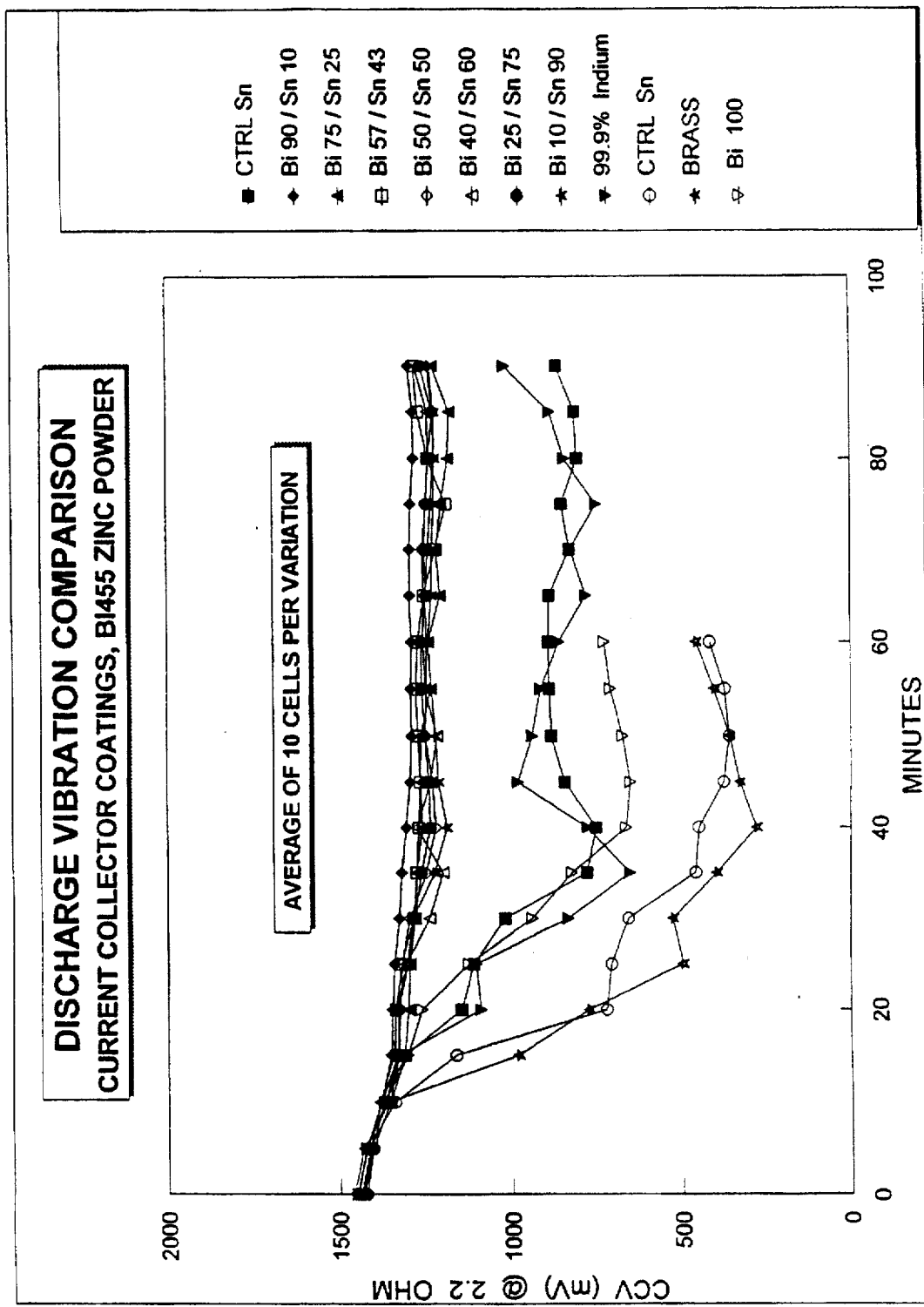
FIG. 9 summarizes the performance results of cells provided with a current collector having bismuth-tin coating in various ratios.

FIG. 9 summarizes the performance results of cells provided with a current collector having bismuth-tin coating in various ratios. The Figure demonstrates that no failure is observed over the entire ratio range, while uncoated brass, or tin-, indium-, or bismuth-coated current collectors are failure-prone.

Figure 10:
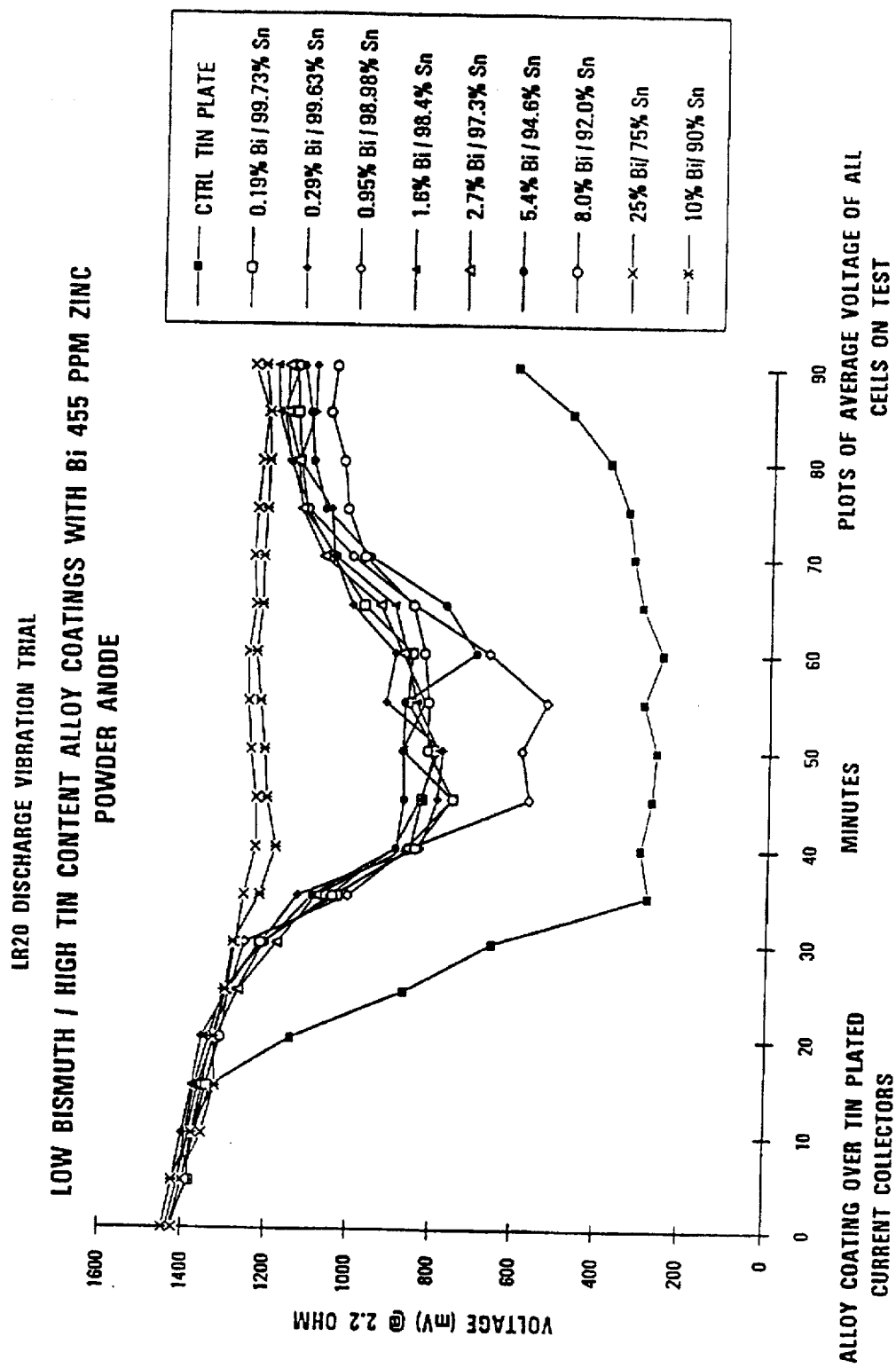
FIG. 10 summarizes the performance results of cells provided with a current collector having bismuth-tin coating in various ratios of between 0.19:99.73 and 25:75.

FIG. 10 summarizes the performance results of cells provided with a current collector having bismuth-tin coating in various ratios of between 0.19:99.73 and 25:75. It is apparent that, although all ranges below 10% bismuth show failures, substantial improvement is observed for any amount of bismuth in the tin-bismuth coating of the current collector.

In summary, these Figures demonstrate that improved discharge vibration performance is realized only when the coating on the current collector includes both bismuth and tin. It is notable also that these results can be obtained using an anode that contains bismuth and zinc, but that contains no indium.

Figure 18:
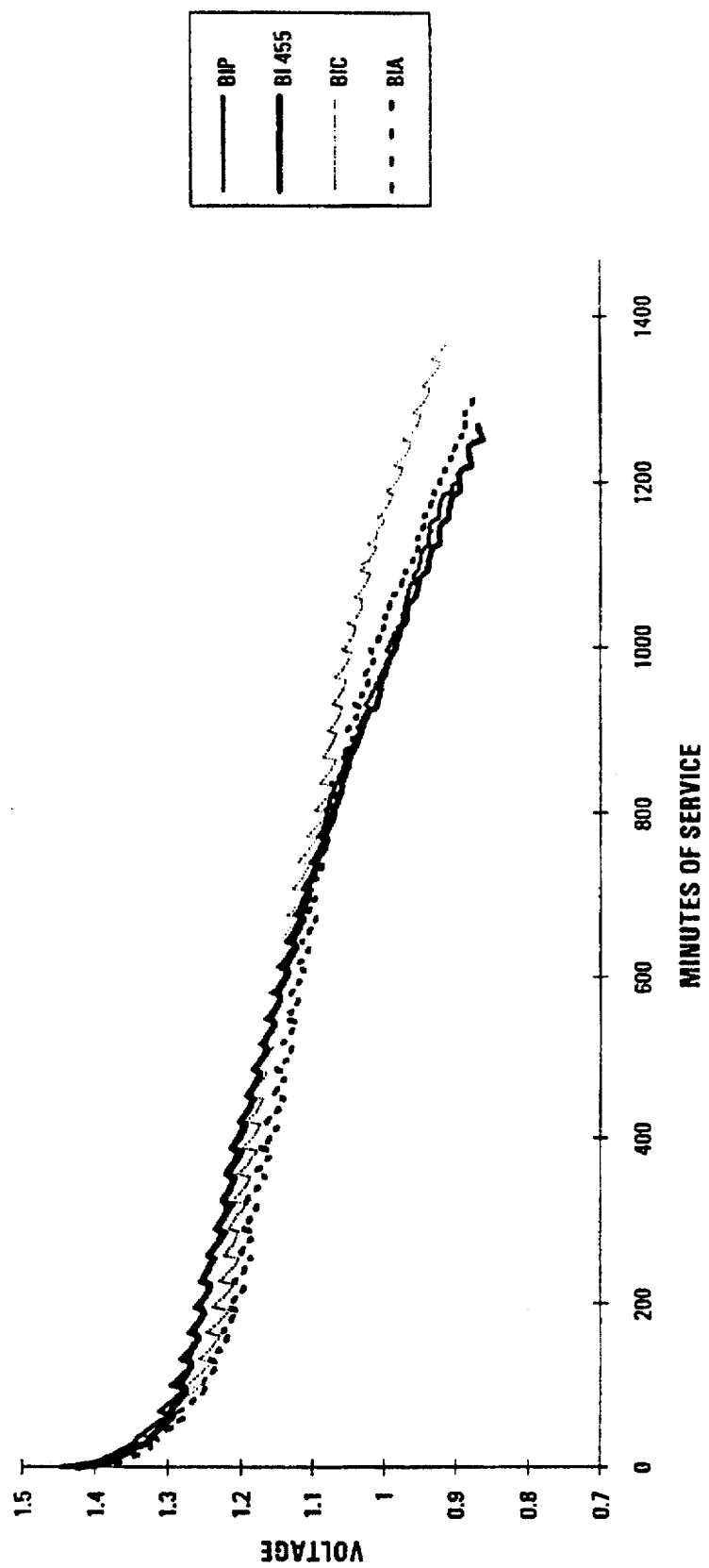
FIGS. 18 and 19 demonstrate the performance of cells containing various anode alloys in intermittent drain (2.2 Ohm LIF) tests after storage at high temperature for 3 months.
Figure 19:
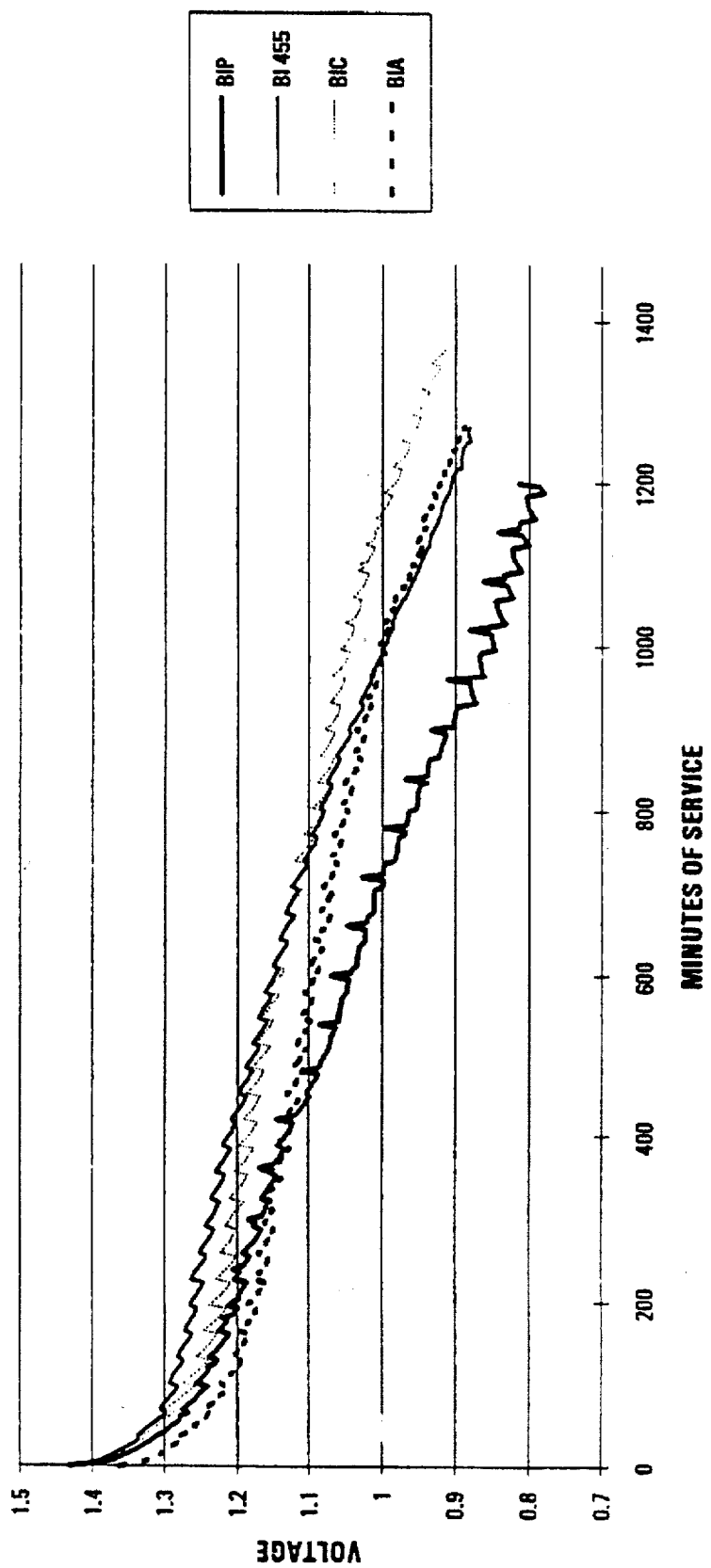

LR20 cells containing Bi-only zinc alloy anodes perform comparably to cells containing indium alloys in standard ANSI tests No significant performance penalty is experienced in achieving an indium-free cell, as is shown in Table 4. While BIC is shown to be superior and BIA is shown comparable at the final ANSI endpoints, bismuth-only alloys are typically superior at the higher voltage discharge endpoints on the intermittent drains, as is shown in FIG. 18, where the bismuth-only alloy and the BIP alloy are indistinguishable. This is also shown in FIG. 19 where the bismuth-only alloy is superior to all alloys over the first 600 minutes.

TABLE 4

LR20 Performance Summary (avg of 3 trials)

| Storage Condition | BIP | BIC | BIA | Bi 244 ppm | Bi 455 ppm |
|---|---|---|---|---|---|
| 2.2 Ohm LIFT (Minutes to .9 Volts) | | | | | |
| Initial @ 70 F. | 1357 | 1414 | 1242 | 1376 | 1355 |
| After 3 Months @ 113 F. | 1203 | 1372 | 1226 | 1239 | 1179 |
| After 3 Months @ 130 F. | 1150 | 1388 | 1212 | 1230 | 1208 |
| After 3 Months @ 160 F. | 952 | 1234 | N/A | 1096 | 1165 |
| 2.2 Ohm 1 Hour/Day (Hours to .8 Volts) | | | | | |
| Initial @ 0 F. | 3.7 | 3.5 | N/A | 3.8 | 4.0 |
| Initial @ 32 F. | 17.88 | 19.85 | N/A | 18.76 | 18.4 |
| Initial @ 70 F. | 22.56 | 24.23 | 21.82 | 22.67 | 22.55 |
| After 3 Months @ 113 F. | 22.36 | 23.70 | 20.46 | 22.15 | 22.06 |
| After 3 Months @ 130 F. | 22.06 | 24.50 | 20.47 | 22.18 | 22.18 |
| After 3 Months @ 160 F. | 20.2 | 23.88 | N/A | 20.41 | 19.84 |
| 3.9 Ohm 1 Hour/Day (Hours to .9 Volts) | | | | | |
| Initial @ 70 F. | 39.89 | 41.26 | 37.58 | 39.74 | 39.94 |
| After 3 Months @ 113 F. | 37.70 | 41.72 | 36.49 | 38.18 | 38.05 |
| After 3 Months @ 130 F. | 37.09 | 41.42 | 36.51 | 37.32 | 36.92 |
| After 3 Months @ 160 F. | 34.85 | 39.36 | N/A | 34.57 | 35.02 |
| 39 Ohm 4 Hour/Day (Hours to .9 Volts) | | | | | |
| Initial @ 70 F. | 526 | 537 | 549 | 531 | 528 |
| Initial @ 32 F. | 499 | 511 | N/A | 505 | 508 |
| Initial @ 0 F. | 454 | 473 | N/A | 461 | 448 |

LR6 cells containing bismuth-only zinc alloy anodes perform comparably to lead- and indium- bearing alloys.

LR6 cells containing bismuth-only zinc alloys generally perform comparably to lead- and indium-bearing alloys as shown in Table 5, both initially and after high temperature storage. After high temperature storage, on the high-rate 1.8 Ohm photoflash test, bismuth-only alloys are significantly better than the other lead-free alloys.

TABLE 5

LR6 Performance Summary (avg. of 3 trials)

| Storage Condition | BIP | BIC | BIA | Bi 244 ppm | Bi 455 ppm |
|---|---|---|---|---|---|
| 1.8 Ohm Photoflash, 15 Sec/Min (Pulses to .9 Volts) | | | | | |
| Initial @ 70 F. | 580 | 551 | 581 | 574 | 576 |
| After 3 Months @ 113 F. | 538 | 449 | 504 | 548 | 540 |
| After 3 Months @ 130 F. | 536 | 450 | 509 | 547 | 561 |
| After 3 Months @ 160 F. | 323 | 210 | N/A | 308 | 309 |
| 3.9 Ohm 1 Hour/Day (Hours to .8 Volts) | | | | | |
| Initial @ 0 F. | .93 | .90 | N/A | .77 | .77 |
| Initial @ 32 F. | 4.7 | 4.2 | N/A | 4.3 | 4.4 |
| Initial @ 70 F. | 6.98 | 6.98 | 6.99 | 6.81 | 6.97 |
| After 3 Months @ 113 F. | 6.54 | 6.71 | 6.59 | 6.56 | 6.56 |
| After 3 Months @ 130 F. | 6.56 | 6.53 | 6.62 | 6.53 | 6.55 |
| After 3 Months @ 160 F. | 5.66 | 5.69 | N/A | 5.54 | 5.48 |
| 3.9 Ohm 5 Minutes/Day (Minutes to .9 Volts) | | | | | |
| | 350 | 365 | 352 | 358 | 354 |
| 10 Ohm 1 Hour/Day (Hours to .9 Volts) | | | | | |
| Initial @ 70 F. | 17.77 | 17.43 | 17.29 | 17.42 | 17.54 |
| After 3 Months @ 113 F. | 16.77 | 16.95 | 16.67 | 16.92 | 16.94 |
| After 3 Months @ 130 F. | 16.49 | 16.86 | 16.78 | 16.62 | 16.70 |
| After 3 Months @ 160 F. | 15.39 | 15.54 | N/A | 15.39 | 15.46 |
| 75 Ohm 1 Hour/Day (Hours to .9 Volts) | | | | | |
| Initial @ 70 F. | 152 | 150 | 150 | 152 | 151 |
| Initial @ 113 F. | 147.5 | 142.1 | 147.6 | 147.3 | 146.7 |
| Initial @ 130 F. | 146.5 | 146.7 | 148 | 146.1 | 146.5 |
| After 3 Months @ 160 F. | 142.4 | 140.0 | N/A | 142.4 | 141.8 |

LR20 cells containing Bi-Sn coated nail perform comparably to cells lacking coated nail In the following table, the tested cells included an anode alloy containing 455 ppm bismuth; the Bi/Sn ratio indicates the composition of the nail coating. No loss in performance is experienced using an indium-free bismuth-only zinc alloy in conjunction with the bismuth-tin coated current collector, while achieving the aforementioned superior discharge vibration performance.

TABLE 6

LR20 Performance Summary (avg. of 3 trials)

| Storage Condition | Sn-plated nail | Bi 90/Sn 10 coated | Bi 43/Sn 57 coated |
|---|---|---|---|
| 2.2 Ohm 1 Hour/Day (Hours to .8 Volts) | | | |
| 2.2 Ohm Initial @ 0 F. | 4.17 | 4.42 | 4.46 |
| 2.2 Ohm Initial @ 32 F. | 12.83 | 12.87 | 12.79 |
| Initial @ 70 F. | 23.65 | 23.96 | 23.93 |
| After 3 Months @ 130 F. | 23.50 | 23.17 | 23.01 |
| After 3 Months @ 160 F. | 20.30 | 20.31 | 19.49 |
| 2.2 Ohm LIFT (Minutes to .9 Volts) | | | |
| Initial @ 70 F. | 1320 | 1311 | 1318 |
| After 3 Months @ 113 F. | 1144 | 1186 | 1193 |
| After 3 Months @ 130 F. | 1141 | 1079 | 1151 |
| 3.9 Ohm 1 Hour/Day (Hours to .9 Volts) | | | |
| Initial @ 70 F. | 41.03 | 40.58 | 41.31 |
| After 3 Months @ 113 F. | 39.35 | 39.22 | 39.81 |
| After 3 Months @ 130 F. | 36.35 | 34.87 | 33.51 |

Performance is superior after high temperature storage

The bismuth-tin coated current collector also provides for superior cell performance, particularly after an extended period of storage at a high temperature. After storage at 130° F. or 160° F., the 455 ppm bismuth-only zinc powder gives a much less depressed discharge voltage profile on the intermittent tests at the higher voltage discharge end points than does BIC or BIA with a tin-plated current collector.

Figure 11:
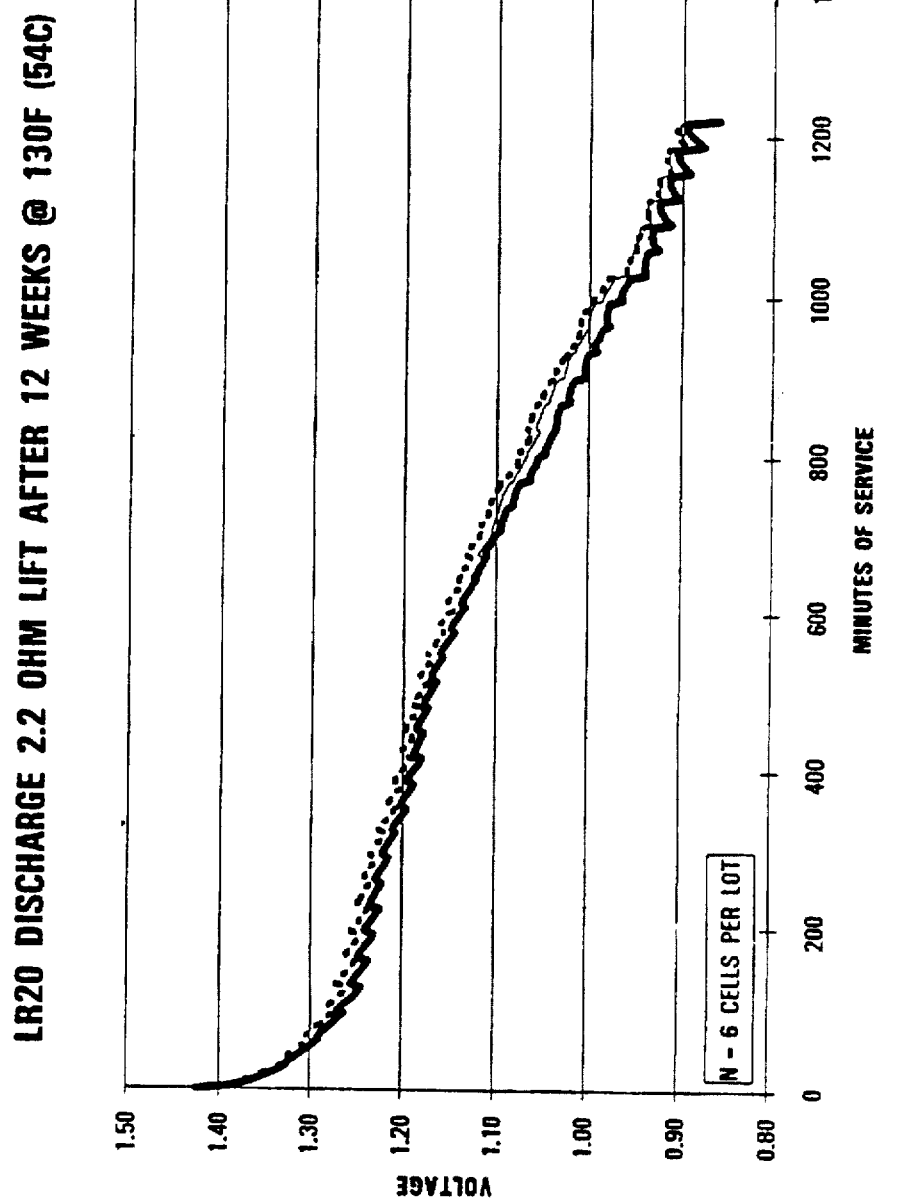
FIGS. 11–13 summarize the performance results of cells containing a bismuth-only alloy in the anode and a bismuth-tin coated current collector after storage at high temperature.

FIG. 11 demonstrates even more performance improvement on the 2.2 Ohm LIF test using the bismuth additive in conjunction with the bismuth-tin coated current collectors at ratios of 90:10 and 43:57 while having none of the vibration discharge failures as demonstrated in FIG. 6. Particular improvement is noted between 400 and 1000 minutes.

Figure 12:
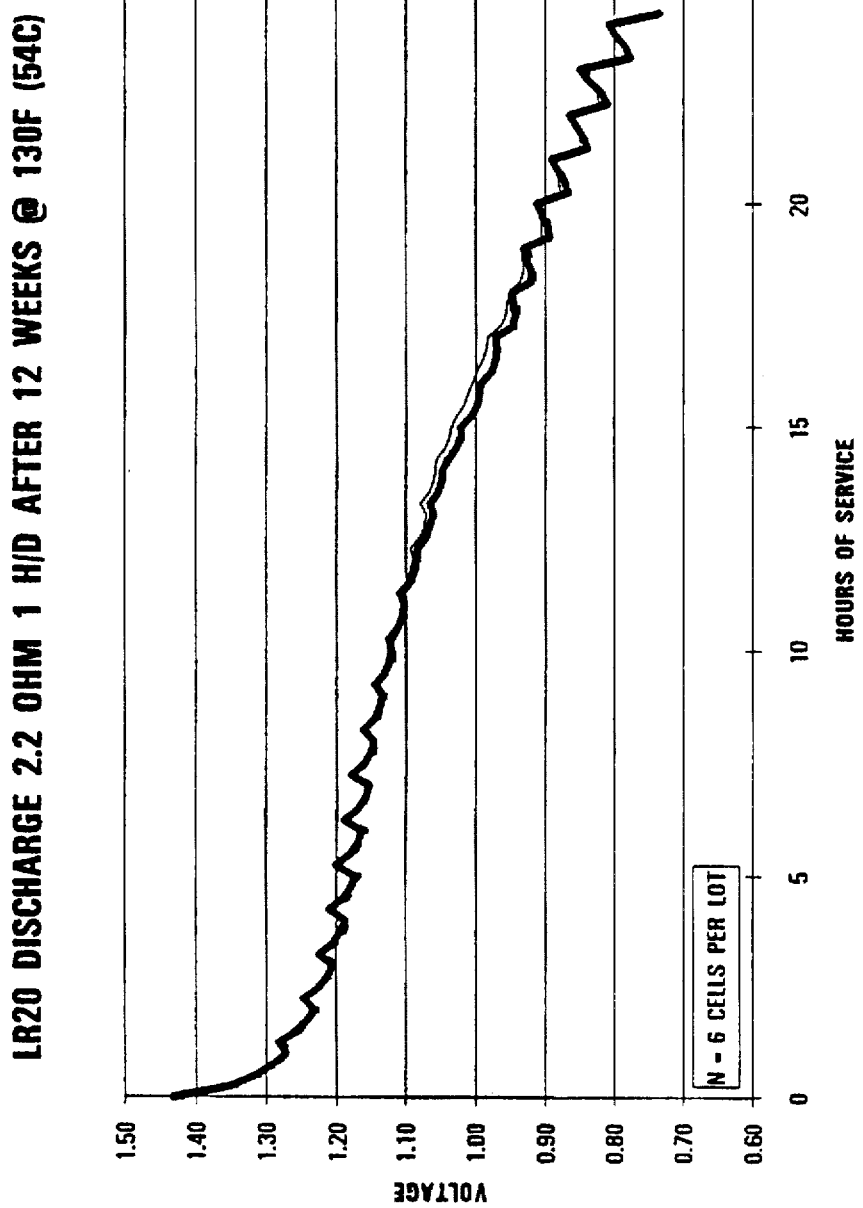
Figure 13:
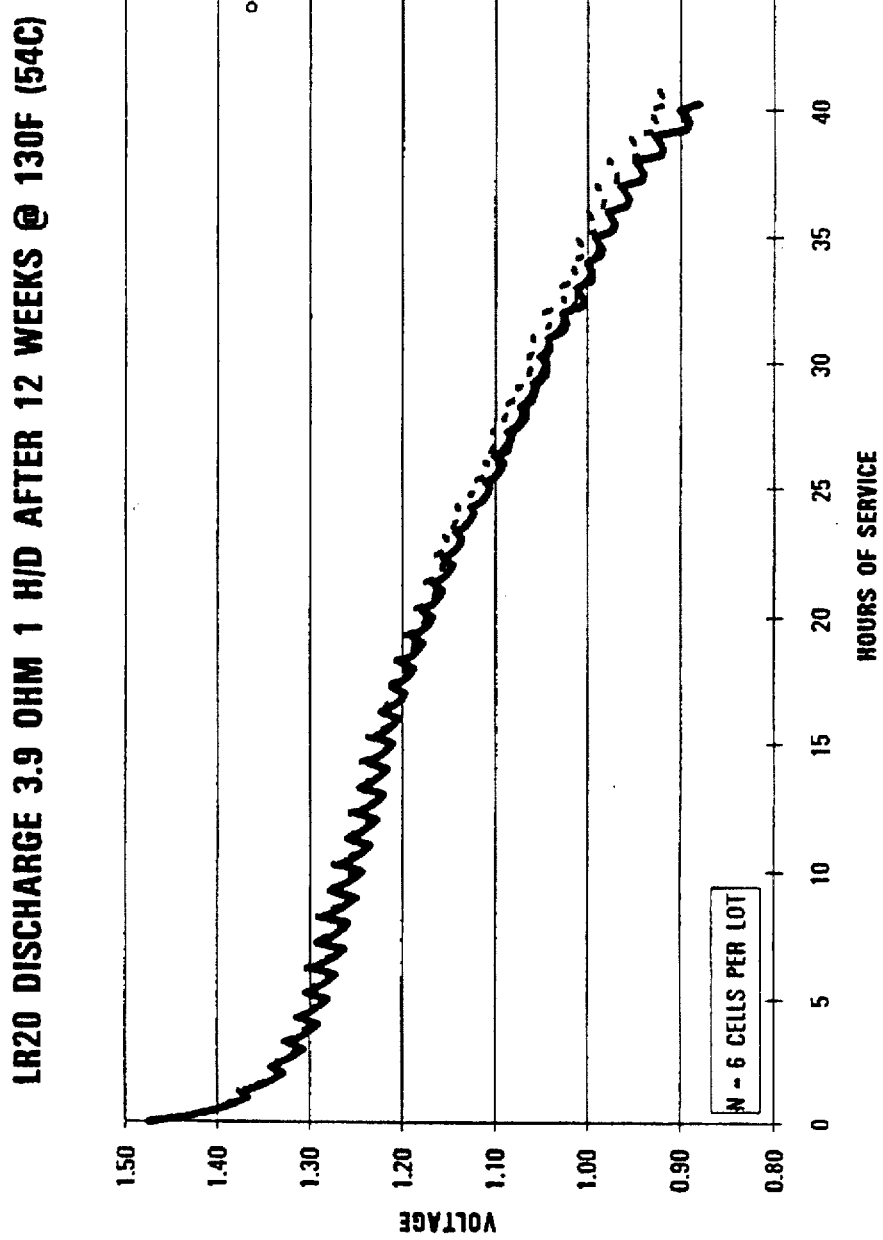

The use of the bismuth-tin coated current collector maintains this superior performance of the bismuth-only zinc powder after high temperature storage conditions while providing superior vibration discharge performance as redundantly demonstrated in FIGS. 11, 12, and 13.

Soluble bismuth additive in cell electrolyte improves performance after storage at 130° F.; performance of other oxides can be enhanced by bismuth-tin coated current collector In the following experiments, performance was evaluated after storage at 130° F. for 3 months. Control cells were made with a gelled zinc anode containing 455 ppm bismuth-zinc powder, indium hydroxide additive, and a tin-plated current collector.

Figure 14:
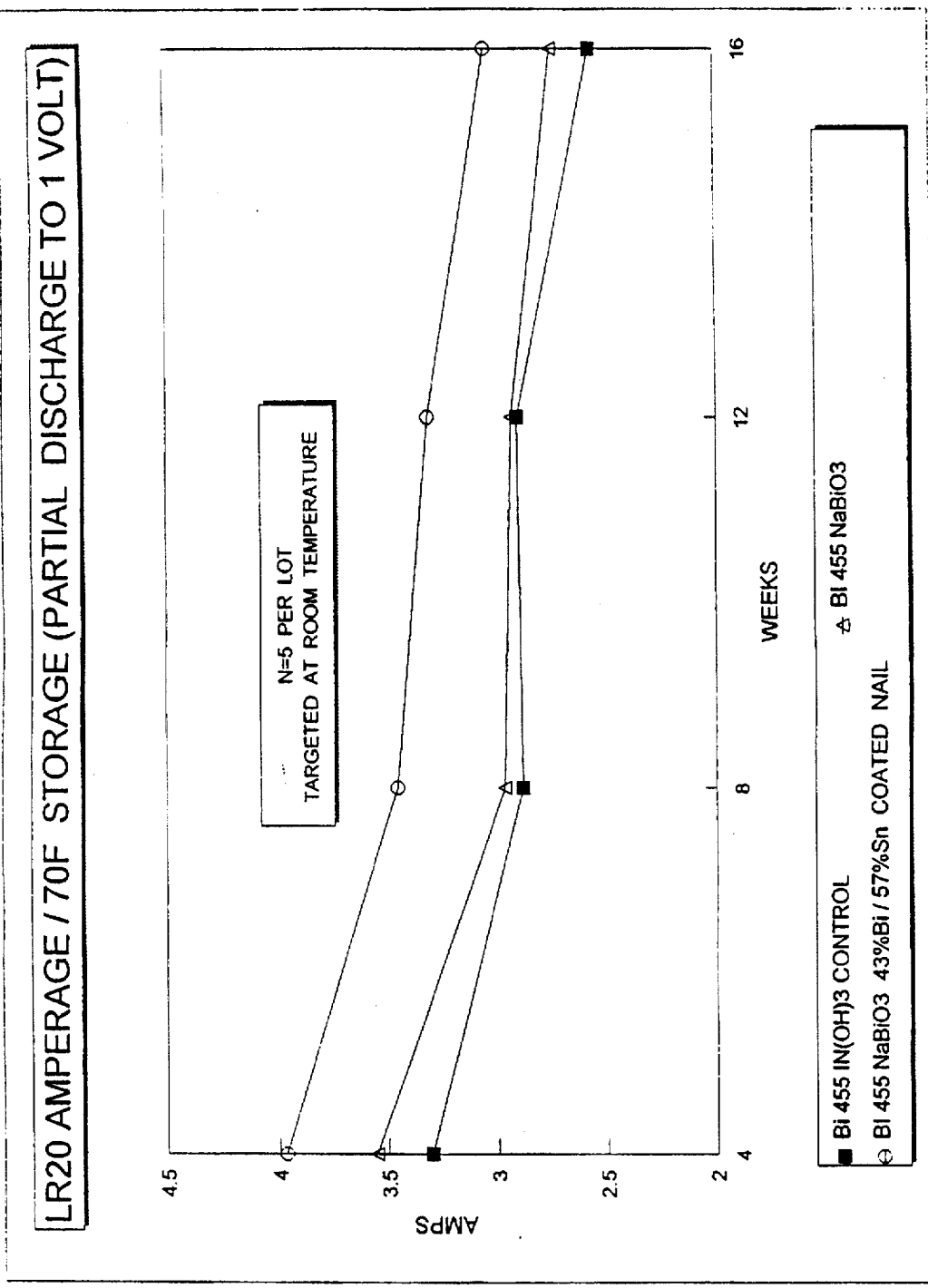
FIG. 14 demonstrates the improved amperage retention of cells containing a soluble bismuth compound in the electrolyte, both with and without a bismuth-tin coated current collector.

Replacement of the indium hydroxide in the control with the bismuth additive, in this case sodium bismuthate, improves amperage retention in cells partially discharged to 1 V and stored for several months, as shown in FIG. 14. The improvement is even greater when the bismuth additive is used in conjunction with a bismuth-tin coated current collector. Moreover, when stored at 160° F. after partial discharge, only the cells containing the bismuth-tin coated current collector showed any amperage retention at eight weeks.

Figure 15:
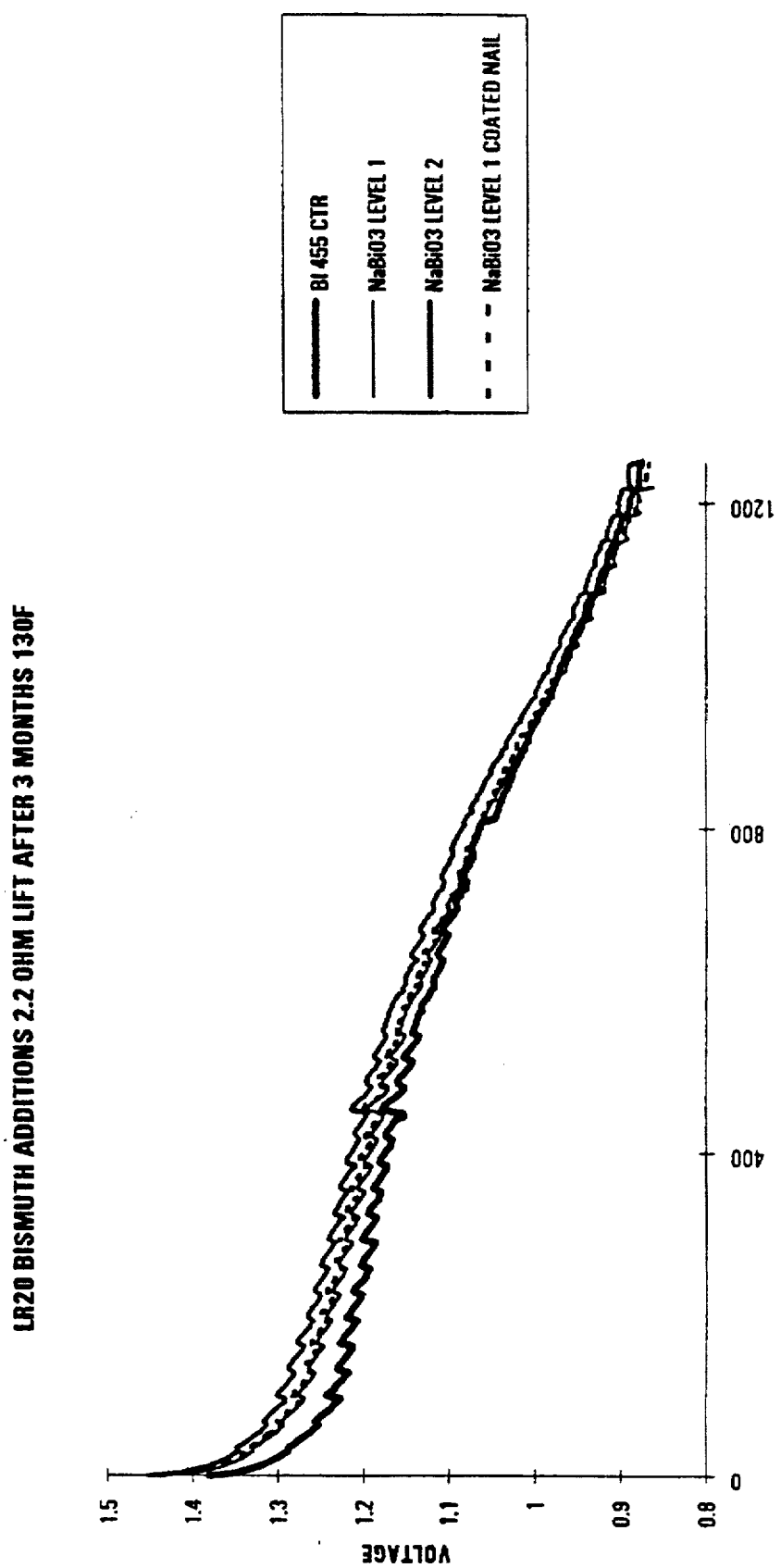
FIG. 15 demonstrates improved performance of cells containing a bismuth-only alloy in the anode and a soluble bismuth compound in the electrolyte, both with and without a bismuth-tin coated current collector.

FIG. 15 demonstrates that performance after storage at high temperature can be enhanced by adding a low level of the soluble bismuth compound, and can be further enhanced by adding more of the soluble bismuth compound or by providing both the soluble bismuth compound and the coated current collector.

Figure 16:
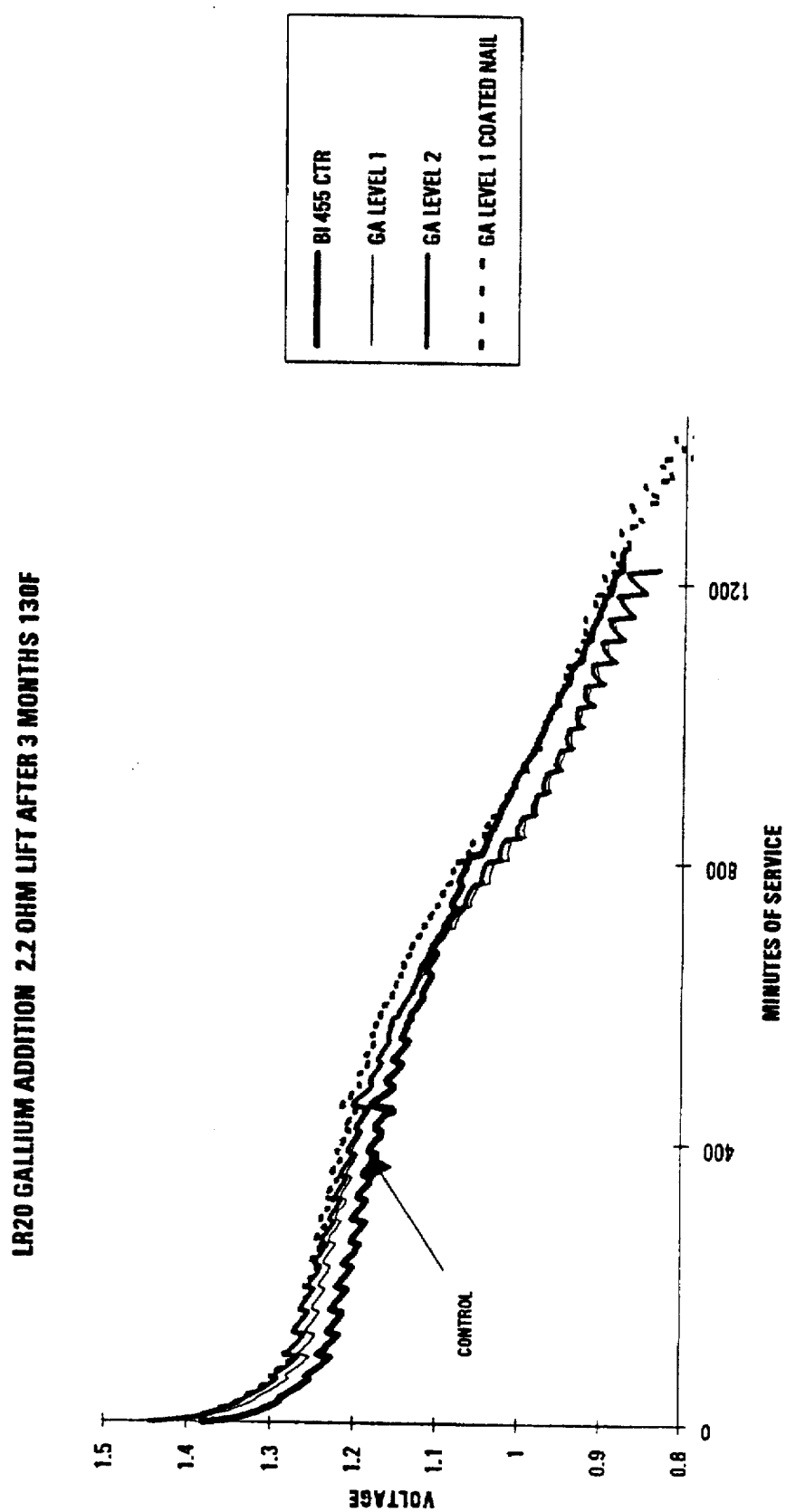
FIG. 16 demonstrates improved performance of cells containing a gallium oxide additive in the electrolyte, especially with a bismuth-tin coated current collector.

In test cells in which gallium oxide replaced indium hydroxide, an enhanced performance profile was observed in the early part of a 2.2 Ohm LIF Test, but performance fell below the performance level of the 455 ppm Bi zinc alloy control at the end of the discharge. In contrast, however, the voltage discharge profile of cells containing both the gallium oxide additive and a bismuth-tin coated current collector did not decline in performance at the end of discharge. Rather, the performance was comparable to the control cells as is shown in FIG. 16.

Figure 17:
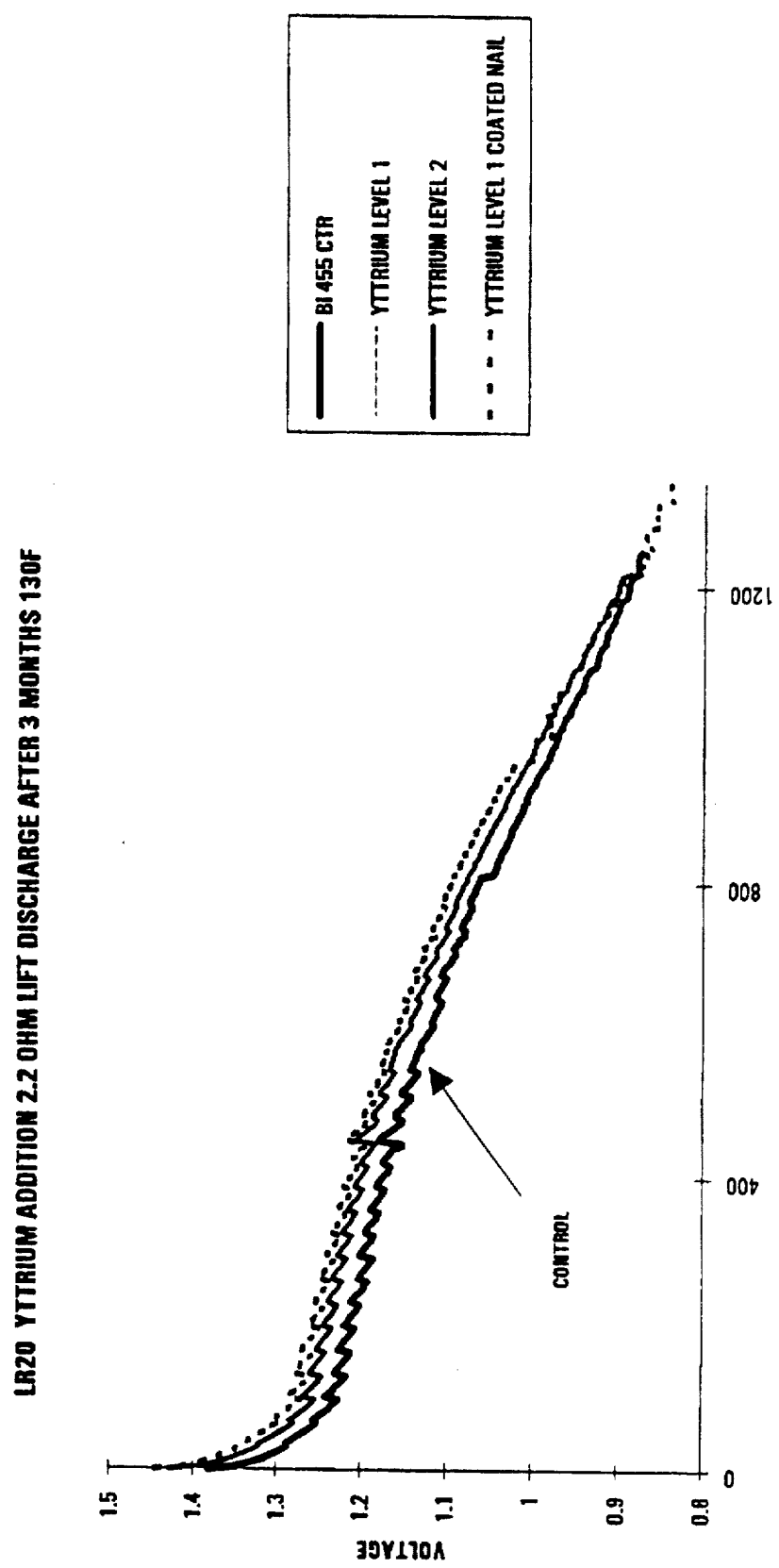
FIG. 17 demonstrates improved performance of cells containing a yttrium oxide additive in the electrolyte, especially with a bismuth-tin coated current collector.

When yttrium oxide is used in combination with either the tin-plated current collector or the bismuth-tin coated current collector, the discharge voltage profile is enhanced, although slightly higher performance is realized using the bismuth-tin coated current collector, as is shown in FIG. 17.

The present invention is not intended to be limited to the exemplified embodiments, but to encompass all such variations and modifications as come within the scope of the appended claims.

We claim:

1. A negative current collector adapted for use in an electrochemical cell, the negative current collector comprising:

a substrate comprising a conductive material; and a coating on the substrate, the coating comprising bismuth, tin and an element in addition to bismuth and tin the element being present at about 5% or less.

2. A current collector as claimed in claim 1 wherein the coating is substantially free of indium.

3. A current collector as claimed in claim 1 wherein the coating is substantially free of lead.

4. A current collector as claimed in claim 1 wherein the coating comprises bismuth at between about 90% and 0.2% by weight.

5. A current collector as claimed in claim 1 wherein the coating comprises bismuth at between about 60% and 0.2% by weight.

6. A current collector as claimed in claim 1 wherein the coating comprises bismuth at between about 43% and 0.2% by weight.

7. A current collector as claimed in claim 1 wherein the coating comprises bismuth at between about 20% an 0.2% by weight.

8. A current collector as claimed in claim 1 wherein the coating comprises bismuth at about 10% by weight.

9. A current collector as claimed in claim 1 wherein the coating comprises tin at about between 10 and 99.8%.

10. A current collector as claimed in claim 1 wherein the coating comprises tin at between 10 and 90%.

11. A current collector as claimed in claim 1 wherein the coating comprises tin at between 10 and 60%.

12. A current collector as claimed in claim 1 wherein the coating comprises the element at about 3%.

13. A current collector as claimed in claim 1 wherein the element is selected from the group consisting of titanium, thallium, zirconium, calcium, cerium, magnesium, manganese, silicon, zinc, copper, indium, cadmium, and lead.

14. A current collector as claimed in claim 1 wherein the conductive material is selected from the group consisting of steel, brass, copper, and tin-plated brass.

15. A current collector as claimed in claim 1 wherein the substrate is tin-plated brass.

16. A gelled anode adapted for use in an electrochemical cell, the gelled anode comprising:
an alloy powder comprising bismuth and zinc and being substantially free of aluminum calcium indium and lead;
a gelling agent; and
an electrolyte comprising a soluble bismuth additive,
the alloy powder, the gelling agent, and the electrolyte being uniformly mixed together.

17. A gelled anode as claimed in claim 16 wherein the soluble bismuth additive is selected from the group consisting of sodium bismuthate, bismuth hydroxide, bismuth trioxide, and bismuth sulfate.

18. A gelled anode as claimed in claim 16 wherein the soluble bismuth additive is sodium bismuthate.

19. A gelled anode as claimed in claim 16, wherein the alloy powder further comprises an element selected from the group consisting of mercury, cadmium, gallium, thallium, and tin.

20. A gelled anode as claimed in claim 16, wherein the alloy powder is substantially free of mercury, cadmium, calcium, aluminum, indium, gallium, thallium, lead, and tin.

21. A gelled anode as claimed in claim 16 further comprising a surfactant in the anode.

22. A gelled anode as claimed in claim 16 wherein the electrolyte is potassium hydroxide.

23. A gelled anode as claimed in claim 16, wherein the alloy powder comprises bismuth at between 100 and 2000 ppm.

24. A gelled anode as claimed in claim 16, wherein the alloy powder comprises bismuth at between 200 and 500 ppm.

25. A gelled anode as claimed in claim 16, wherein the alloy powder comprises bismuth at between 240 and 475 ppm.

26. A gelled anode as claimed in claim 16, wherein the alloy powder comprises bismuth at about 450 ppm.

27. A gelled anode as claimed in claim 16 wherein the alloy powder further comprises iron at 3 ppm or less.

28. A gelled anode as claimed in claim 16 wherein the alloy powder further comprises iron at 2 ppm or less.

29. A gelled anode as claimed in claim 16 wherein the alloy powder further comprises iron at 1 ppm or less.

30. An electrochemical cell comprising:
a positive current collector;
a cathode in contact with the positive current collector;
a gelled zinc anode inside the cathode, the anode comprising a gelling agent, an electrolyte, and an alloy powder comprising bismuth and zinc, the gelling agent, the electrolyte and the alloy powder being uniformly mixed together;
a separator between the cathode and the anode; and
a negative current collector in electrical contact with the anode, the negative current collector comprising a substrate formed of a conductive material and a coating on the substrate, the coating comprising bismuth and tin.

31. An electrochemical cell as claimed in claim 30 wherein the coating is substantially free of indium.

32. An electrochemical cell as claimed in claim 30 wherein the coating is substantially free of lead.

33. An electrochemical cell as claimed in claim 30 wherein the coating comprises bismuth at between about 90% and 0.2% by weight.

34. An electrochemical cell as claimed in claim 30 wherein the coating comprises bismuth at between about 60% and 0.2% by weight.

35. An electrochemical cell as claimed in claim 30 wherein the coating comprises bismuth at between about 43% and 0.2% by weight.

36. An electrochemical cell as claimed in claim 30 wherein the coating comprises bismuth at between about 20% and 0.2% by weight.

37. An electrochemical cell as claimed in claim 30 wherein the coating comprises bismuth at about 10% by weight.

38. An electrochemical cell as claimed in claim 30 wherein the coating comprises tin at between 10 and 99.8%.

39. An electrochemical cell as claimed in claim 30 wherein the coating comprises tin at between 10 and 90%.

40. An electrochemical cell as claimed in claim 30 wherein the coating comprises tin at between 10 and 60%.

41. An electrochemical cell as claimed in claim 34 wherein the coating further comprises an element in addition to bismuth and tin, the element being present in the coating at about 5% or less.

42. An electrochemical cell as claimed in claim 41 wherein the element is present in the coating at about 3%.

43. An electrochemical cell as claimed in claim 41 wherein the element is selected from the group consisting of titanium, thallium, zirconium, calcium, cerium, magnesium, manganese, silicon, zinc, copper, indium, cadmium, and lead.

44. An electrochemical cell as claimed in claim 41 wherein the element is zinc.

45. An electrochemical cell as claimed in claim 30 wherein the conductive material is selected from the group consisting of steel, brass, copper, and tin-plated brass.

46. An electrochemical cell as claimed in claim 30 wherein the substrate is tin-plated brass.

47. An electrochemical cell as claimed in claim 30 wherein the anode further comprises an element selected from the group consisting of mercury, cadmium, calcium, indium, gallium, thallium, lead, and tin.

48. An electrochemical cell as claimed in claim 30 wherein the anode is substantially free of mercury, cadmium, calcium, aluminum, indium, gallium, thallium, lead, and tin.

49. An electrochemical cell as claimed in claim 30 wherein the electrochemical cell is selected from the group consisting of a primary alkaline cell, a secondary alkaline cell, a zinc/air cell, a nickel-zinc cell, an alkaline-manganese (zinc-MnO$_2$) cell, a silver-zinc cell, and a mercury-zinc cell.

50. An electrochemical cell as claimed in claim 30 wherein the electrochemical cell is a primary alkaline cell.

51. An electrochemical cell as claimed in claim 30 wherein the electrochemical cell is a secondary alkaline cell.

52. An electrochemical cell as claimed in claim 30 further comprising a surfactant in the anode.

53. An electrochemical cell as claimed in claim 30 wherein the electrolyte is potassium hydroxide.

54. An electrochemical cell as claimed in claim 30, wherein the alloy powder comprises bismuth at between 100 and 2000 ppm.

55. An electrochemical cell as claimed in claim 30, wherein the alloy powder comprises bismuth at between 200 and 500 ppm.

56. An electrochemical cell as claimed in claim 30, wherein the alloy powder comprises bismuth at between 240 and 475 ppm.

57. An electrochemical cell as claimed in claim 30, wherein the alloy powder comprises bismuth at about 450 ppm.

58. An electrochemical cell as claimed in claim 30 wherein the alloy powder comprises iron at 3 ppm or less.

59. An electrochemical cell as claimed in claim 30 wherein the alloy powder comprises iron at 2 ppm or less.

60. An electrochemical cell as claimed in claim 30 wherein the alloy powder comprises iron at 1 ppm or less.

61. An electrochemical cell comprising:
a positive current collector;
a cathode in contact with the positive current collector;
a gelled zinc anode inside the cathode, the anode comprising a gelling agent, an electrolyte comprising a soluble bismuth additive, and an alloy powder comprising bismuth and zinc, the alloy powder being substantially free of aluminum, calcium, indium, and lead, the gelling agent, the electrolyte and the alloy powder being uniformly mixed together;
a separator between the cathode and the anode; and
a negative current collector in electrical contact with the anode.

62. An electrochemical cell as claimed in claim 61 wherein the soluble bismuth additive is selected from the group consisting of sodium bismuthate, bismuth hydroxide, bismuth trioxide, and bismuth sulfate.

63. An electrochemical cell as claimed in claim 61 wherein the soluble bismuth additive is sodium bismuthate.

64. An electrochemical cell as claimed in claim 61 wherein the electrolyte is substantially free of indium hydroxide.

65. An electrochemical cell as claimed in claim 61 wherein the electrolyte is substantially free of indium sulfide.

66. An electrochemical cell as claimed in claim 61 wherein the anode further comprises an element selected from the group consisting of mercury, cadmium, gallium, thallium, and tin.

67. An electrochemical cell as claimed in claim 61 wherein the anode is substantially free of mercury, cadmium, calcium, aluminum, indium, gallium, thallium, lead, and tin.

68. An electrochemical cell as claimed in claim 63 wherein the electrochemical cell is selected from the group consisting of a primary alkaline cell, a secondary alkaline cell, a zinc/air cell, a nickel-zinc cell, an alkaline-manganese (zinc-MnO$_2$) cell, a silver-zinc cell, and a mercury-zinc cell.

69. An electrochemical cell as claimed in claim 63 wherein the electrochemical cell is a primary alkaline cell.

70. An electrochemical cell as claimed in claim 63 wherein the electrochemical cell is a secondary alkaline cell.

71. An electrochemical cell comprising:
a positive current collector;
a cathode in contact with the positive current collector;
a gelled zinc anode inside the cathode, the anode comprising a gelling agent, an alloy powder comprising bismuth and zinc, and an electrolyte, the gelling agent, the electrolyte and the alloy powder being uniformly mixed together;
a separator between the cathode and the anode; and
a negative current collector in electrical contact with the anode, the negative current collector comprising a substrate formed of a conductive material and a coating on the substrate, the coating comprising bismuth and tin, the electrolyte comprising an additive that can improve contact between the zinc and the negative current collector.

72. An electrochemical cell as claimed in claim 71 wherein the coating is substantially free of indium.

73. An electrochemical cell as claimed in claim 71 wherein the coating is substantially free of lead.

74. An electrochemical cell as claimed in claim 71 wherein the coating comprises bismuth at between about 90% and 0.2% by weight.

75. An electrochemical cell as claimed in claim 71 wherein the coating comprises bismuth at between about 60% and 0.2% by weight.

76. An electrochemical cell as claimed in claim 71 wherein the coating comprises bismuth at between about 43% and 0.2% by weight.

77. An electrochemical cell as claimed in claim 71 wherein the coating comprises bismuth at between about 20% and 0.2% by weight.

78. An electrochemical cell as claimed in claim 71 wherein the coating comprises bismuth at about 10% by weight.

79. An electrochemical cell as claimed in claim 71 wherein the coating comprises tin at between 10 and 99.8%.

80. An electrochemical cell as claimed in claim 71 wherein the coating comprises tin at between 10 and 90%.

81. An electrochemical cell as claimed in claim 71 wherein the coating comprises tin at between 10 and 60%.

82. An electrochemical cell as claimed in claim 71 wherein the coating further comprises an element in addition to bismuth and tin, the element being present in the coating at about 5% or less.

83. An electrochemical cell as claimed in claim 82 wherein the element is present in the coating at about 3%.

84. An electrochemical cell as claimed in claim 82 wherein the element is selected from the group consisting of titanium, thallium, zirconium, calcium, cerium, magnesium, manganese, silicon, zinc, copper, indium, cadmium, and lead.

85. An electrochemical cell as claimed in claim 82 wherein the element is zinc.

86. An electrochemical cell as claimed in claim 71 wherein the conductive material is selected from the group consisting of steel, brass, copper, and tin-plated brass.

87. An electrochemical cell as claimed in claim 71 wherein the substrate is tin-plated brass.

88. An electrochemical cell as claimed in claim 71 wherein the anode further comprises an element selected from the group consisting of mercury, cadmium, calcium, indium, gallium, thallium, lead, and tin.

89. An electrochemical cell as claimed in claim 71 wherein the anode is substantially free of mercury, cadmium, calcium, aluminum, indium, gallium, thallium, lead, and tin.

90. An electrochemical cell as claimed in claim 71 wherein the electrochemical cell is selected from the group consisting of a primary alkaline cell, a secondary alkaline cell, a zinc/air cell, a nickel-zinc cell, an alkaline-manganese (zinc-MnO$_2$) cell, a silver-zinc cell, and a mercury-zinc cell.

91. An electrochemical cell as claimed in claim 71 wherein the electrochemical cell is a primary alkaline cell.

92. An electrochemical cell as claimed in claim 71 wherein the electrochemical cell is a secondary alkaline cell.

93. An electrochemical cell as claimed in claim 71 wherein the electrolyte is substantially free of indium hydroxide.

94. An electrochemical cell as claimed in claim 71 wherein the electrolyte is substantially free of indium sulfide.

95. An electrochemical cell as claimed in claim 71, wherein the additive is selected from the group consisting of an indium hydroxide, indium sulfide, an oxide of gallium, an oxide of yttrium, and a soluble bismuth compound.

96. An electrochemical cell as claimed in claim 95, wherein the soluble bismuth compound is selected from the group consisting of sodium bismuthate, bismuth hydroxide, bismuth trioxide, and bismuth sulfate.

97. An electrochemical cell as claimed in claim 95, wherein the soluble bismuth compound is sodium bismuthate.

98. An electrochemical cell as claimed in claim 71 further comprising a surfactant in the anode.

99. An electrochemical cell as claimed in claim 71 wherein the electrolyte is potassium hydroxide.

100. An electrochemical cell as claimed in claim 71, wherein the alloy powder comprises bismuth at between 100 and 2000 ppm.

101. An electrochemical cell as claimed in claim 71, wherein the alloy powder comprises bismuth at between 200 and 500 ppm.

102. An electrochemical cell as claimed in claim 71, wherein the alloy powder comprises bismuth at between 240 and 475 ppm.

103. An electrochemical cell as claimed in claim 71, wherein the alloy powder comprises bismuth at about 450 ppm.

104. An electrochemical cell as claimed in claim 71 wherein the alloy powder comprises iron at 3 ppm or less.

105. An electrochemical cell as claimed in claim 71 wherein the alloy powder comprises iron at 2 ppm or less.

106. An electrochemical cell as claimed in claim 71 wherein the alloy powder comprises iron at 1 ppm or less.

107. A method for forming an alkaline electrochemical cell, the method comprising the steps of:

placing a cathode into a positive current collector open on one end so that the positive current collector contacts the cathode;

introducing a separator so that the separator contacts the cathode;

introducing a gelled anode comprising a gelling agent, an electrolyte, and an alloy powder comprising bismuth and zinc, the gelling agent, the electrolyte and the alloy powder being uniformly mixed together, so that the gelled anode contacts the separator; and placing a negative current collector comprising a substrate formed of a conductive material and a coating on the substrate, the coating comprising bismuth and tin, into the open end of the container so that the negative current collector contacts the gelled anode.

108. A method as claimed in claim 107 wherein the anode further comprises an element selected from the group consisting of mercury, cadmium, calcium, indium, gallium, thallium, lead, and tin.

109. An method as claimed in claim 107 wherein the anode is substantially free of mercury, cadmium, calcium, aluminum, indium, gallium, thallium, lead, and tin.

110. A method for forming an alkaline electrochemical cell, the method comprising the steps of:

placing a cathode into a positive current collector open on one end so that the positive current collector contacts the cathode;

introducing a separator so that the separator contacts the cathode;

introducing a gelled anode comprising a gelling agent, an electrolyte comprising a soluble bismuth additive, and an alloy powder comprising bismuth and zinc and being substantially free of aluminum, calcium, indium, and lead, the gelling agent, the electrolyte and the alloy powder being uniformly mixed together, so that the gelled anode contacts the separator; and placing a negative current collector into the open end of the container so that the negative current collector contacts the gelled anode.

111. A method as claimed in claim 110 wherein the anode further comprises an element selected from the group consisting of mercury, cadmium, gallium, thallium, and tin.

112. An method as claimed in claim 110 wherein the anode is substantially free of mercury, cadmium, calcium, aluminum, indium, gallium, thallium, lead, and tin.

113. A method for discharging an alkaline electrochemical cell, the method comprising the steps of:

providing an alkaline electrochemical cell having a positive terminal and a negative terminal, the cell comprising a gelled zinc anode comprising a gelling agent, an electrolyte, and an alloy powder comprising bismuth and zinc, the gelling agent, the electrolyte and the alloy powder being uniformly mixed together, and a negative current collector comprising a substrate formed of a conductive material and a coating on the substrate, the coating comprising bismuth and tin; and connecting the positive terminal and the negative terminal together to form a circuit having a measurable resistance.

114. A method as claimed in claim 113 wherein the anode further comprises an element selected from the group consisting of mercury, cadmium, calcium, indium, gallium, thallium, lead, and tin.

115. An method as claimed in claim 113 wherein the anode is substantially free of mercury, cadmium, calcium, aluminum, indium, gallium, thallium, lead, and tin.

116. A method for discharging an alkaline electrochemical cell, the method comprising the steps of:

providing an alkaline electrochemical cell having a positive terminal and a negative terminal, the cell comprising a gelled zinc anode comprising a gelling agent, an electrolyte comprising a soluble bismuth additive, and an alloy powder comprising bismuth and zinc and being substantially free of aluminum, calcium, indium, and lead, the gelling agent, the electrolyte and the alloy powder being uniformly mixed together, and a negative current collector; and connecting the positive terminal and the negative terminal together to form a circuit having a measurable resistance.

117. A method as claimed in claim 116 wherein the anode further comprises an element selected from the group consisting of mercury, cadmium, gallium, thallium, and tin.

118. An method as claimed in claim 116 wherein the anode is substantially free of mercury, cadmium, calcium, aluminum, indium, gallium, thallium, lead, and tin.

* * * * *